United States Patent
Lopatecki et al.

(10) Patent No.: US 11,775,871 B1
(45) Date of Patent: Oct. 3, 2023

(54) OPTIMIZING MACHINE LEARNING BASED ON EMBEDDING SMART DATA DRIFT

(71) Applicant: ARIZE AI, INC., Mill Valley, CA (US)

(72) Inventors: Jason Lopatecki, Mill Valley, CA (US); Aparna Dhinakaran, Mill Valley, CA (US); Francisco Castillo Carrasco, Mill Valley, CA (US); Michael Schiff, Mill Valley, CA (US); Nathaniel Mar, Mill Valley, CA (US)

(73) Assignee: ARIZE AI, INC., Mill Valley, CA (US)

( * ) Notice: Subject to any disclaimer, the term of this patent is extended or adjusted under 35 U.S.C. 154(b) by 0 days.

(21) Appl. No.: 18/063,380

(22) Filed: Dec. 8, 2022

(51) Int. Cl.
*G06N 20/00* (2019.01)

(52) U.S. Cl.
CPC .................... *G06N 20/00* (2019.01)

(58) Field of Classification Search
None
See application file for complete search history.

(56) References Cited

U.S. PATENT DOCUMENTS

| | | |
|---|---|---|
| 11,295,241 B1 | 4/2022 | Badawy et al. |
| 2019/0306011 A1 | 10/2019 | Fenoglio et al. |
| 2021/0074425 A1 | 3/2021 | Carter et al. |
| 2021/0220670 A1 | 7/2021 | Li et al. |

OTHER PUBLICATIONS

Tang B, Shepherd M, Heywood MI, Luo X. Comparing dimension reduction techniques for document clustering. In Advances in Artificial Intelligence: 18th Conference of the Canadian Society for Computational Studies of Intelligence, Canadian AI 2005, Victoria, Canada, May 9-11, 2005. (Year: 2005).*
Allaoui M, Kherfi ML, Cheriet A. Considerably improving clustering algorithms using UMAP dimensionality reduction technique: a comparative study. In Image and Signal Processing: 9th International Conference, ICISP 2020, Marrakesh, Morocco, Jun. 4-6, 2020, Proceedings 9 2020 (pp. 317-325). Springer. (Year: 2020).*
"Curse of dimensionality", 9 pp. https://en.wikipedia.org/wiki/Curse_of_dimensionality; Retrieved on Apr. 19, 2023.
Hrounda-Rasmussen, "The Curse of Dimensionality", Towards Data Science, 10 pp. https://towardsdatascience.com/the-curse-of-dimensionality-5673118fe6d2; Retrieved on Apr. 19, 2023.

(Continued)

*Primary Examiner* — Vincent Gonzales
(74) *Attorney, Agent, or Firm* — DLA PIPER LLP (US

(57) ABSTRACT

Techniques for optimizing a machine learning model. The techniques can include: obtaining one or more embedding vectors based on a prediction of a machine learning model; mapping the embedding vectors from a higher dimensional space to a 2D/3D space to generate one or more high density points in the 2D/3D space; clustering the high-density points by running a clustering algorithm multiple times, each time with a different set of parameters to generate one or more clusters; applying a purity metric to each cluster to generate a normalized purity score of each cluster; identifying one or more clusters with a normalized purity score lower than a threshold; and optimizing the identifying one or more clusters.

20 Claims, 33 Drawing Sheets

(56) References Cited

OTHER PUBLICATIONS

"Embeddings", Open AI, 8 pp. https://beta.openai.com/docs/guides/embeddings; Retrieved on Apr. 19, 2023.
"What are Vector Embeddings?" Pinecone, 8 pp. https://www.pinecone.io/learn/vector-embeddings/; Retrieved on Apr. 19, 2023.
Healy, Uniform Manifold Approximation and Protection for Dimension Reduction, J, UMAP, 6 pp. (2018) https://umap-learn.readthedocs.io/en/latest/; Retrieved on Apr. 19, 2023.
Lindgren, "Dealing with Highly Dimensional Data using Principal Component Analysis (PCA)", Towards Data Science, 9 pp.https://towardsdatascience.com/dealing-with-highly-dimensional-data-using-principal-component-analysis-pca-fea1ca817fe6 ; Retrieved on Apr. 19, 2023.
International Search Report for International Application No. PCT/US2022/051800, dated Feb. 7, 2023.
Written Opinion for International Application No. PCT/US2022/051800, dated Feb. 7, 2023.
Yu H, Liu T, Lu J, Zhang G. Automatic Learning to Detect Concept Drift. arXiv preprint arXiv:2105.01419. May 4, 2021. (Year: 2021).
Goldenberg I, Webb GI. Survey of distance measures for quantifying concept drift and shift in numeric data. Knowledge and Information Systems. Aug. 2019;60(2):591-615. (Year: 2019).
Jeatrakul P, Wong KW, Fung CC. Data cleaning for classification using misclassification analysis. Journal of Advanced Computational Intelligence and Intelligent Informatics. 2010;14(3):297-302. (Year: 2010).
Greco S, Cerquitelli T. Drift Lens: Real-time unsupervised Concept Drift detection by evaluating per-label embedding distributions. In 2021 International Conference on Data Mining Workshops (ICDMW) Dec. 7, 2021 (pp. 341-349). IEEE. (Year: 2021).
Castellani A, Schmitt S, Hammer B. Task-Sensitive Concept Drift Detector with Constraint Embedding. In 2021 IEEE Symposium Series on Computational Intelligence (SSCI) Dec. 5, 2021 (pp. 01-08). IEEE. (Year: 2021).
Koychev, Ivan. "Approaches for Learning Classifiers of Drifting Concepts." NATO Security Through Science Series D-Information and Communication Security 15 (2008): 176. (Year: 2008).
Pathak, Kumarjit, and Jitin Kapila. "Reinforcement evolutionary learning method for self-learning." arXiv preprint arXiv:1810.03198 2018). (Year: 2018).
Shanbhag, Aalok, Avijit Ghosh, and Josh Rubin. "Unified shapley framework to explain prediction drift." arXiv preprint arXiv: 2102.07862 (2021). (Year: 2021).
Yuan, Yifei, Zhixiong Wang, and Wei Wang. "Unsupervised concept drift detection based on multi-scale slide windows." Ad Hoc Networks 111 (2021): 102325. (Year: 2021).
Strumbelj, Erik, and Igor Kononenko. "Explaining prediction models and individual predictions with feature contributions." Knowledge and information systems 41.3 (2014): 647-665. (Year: 2014).
Agarwal, Sray, and Shashin Mishra. Responsible AI. Springer International Publishing, 2021. (Year: 2021).
Merrick, Luke, and Ankur Taly. "The explanation game: Explaining machine learning models using shapley values." International Cross-Domain Conference for Machine Learning and Knowledge Extraction. Springer, Cham, 2020. (Year: 2020).
International Search Report and Written Opinion for International Application No. PCT/US2022/071234, dated Apr. 11, 2022.
International Search Report and Written Opinion for International Application No. PCT/US2023/064798, dated Apr. 27, 2023.
Kun, "What does it mean for an algorithm to be fair" Math Programing, 34 pp. (2015), https://jeremykun.com/2015/07/13/what-does-it-mean-for-an-algorithm-to-be-fair/, Retrieved May 1, 2023.
"Disparate Impact (DI)", 2 pp. (2023) https://docs.aws.amazon.com/sagemaker/latest/dg/clarify-post-training-bias-metric-di.html, Retrieved May 1, 2023.
"Disparate Impact Analysis" 1 pg. https://h2oai.github.io/tutorials/disparate-impact-analysis/#4, Retrieved May 1, 2023.
"AI Fairness 360", 3 pp. https://aif360.mybluemix.net/compare, Retrieved May 1, 2023.
"Fairness", 5 pp. https://docs.fiddler.ai/pages/user-guide/data-science-concepts/fairness/, Retrieved May 1, 2023.
Goel, "Quantifying bias in machine decisions" 59 pp. https://cra.org/ccc/wp-content/uploads/sites/2/2019/05/Sharad-Goel_Machine-bias-CCC.pdf, Retrieved May 1, 2023.
Kun, "One definition of algorithmic fairness: statistical parity", Math Programing, 10 pp., https://jeremykun.com/2015/10/19/one-definition-of-algorithmic-fairness-statistical-parity/. Retrieved Apr. 27, 2023.

\* cited by examiner

OPTIMIZING MACHINE LEARNING BASED ON EMBEDDING SMART DATA DRIFT

RELATED APPLICATIONS

This application is related to U.S. Pat. No. 11,315,043, U.S. patent application Ser. Nos. 17/548,070, 17/703,205, 63/363,103, all of which are incorporated by reference in their entirety.

BACKGROUND

Machine learning models based on computer vision, natural language processing (NLP), self-driving cars or any unstructured high dimensional data struggle with knowing what data in production should be labeled. The labeling process allows a model to train on unknown data allowing it to expand the examples of "what it knows" and greatly improve performance. Finding examples of new data to train the model, at scale, then selectively labeling them is both costly and difficult. The cost of labeling drives many teams to label and use only a very small fraction of their production data, maybe on average 0.1% of production data is used for labeling.

Known approaches use high dimensional vector data directly without use of UMAP (Uniform Manifold Approximation and Projection for Dimension Reduction) or dimension reduction to map data to a lower dimensional space where clustering algorithms have a chance of working. However, the curse of dimensionality makes the results of these solutions poor because in high dimensional space all points look equidistant e.g., everything looks far away from each other. This causes major problems with clustering algorithms. In very high dimensional spaces either not enough points fall within the ball or cluster or too many do (impossibly sensitive to increases in high dimensional volume). This problem is further described in https://en.wikipedia.org/wiki/Curse_of_dimensionality; and https://towardsdatascience.com/the-curse-of-dimensionality-5673118fe6d2. Clustering on high dimensional data leads to sporadic results based on the clusters generated. This is undesirable.

SUMMARY

The present disclosure provides embedding drift techniques to overcome the issues in known techniques by allowing for a tunable stream of production export data for labeling that represents high value data that has not been trained on previously. These techniques can detect drift automatically in clusters or sections of the data and can enable the export of data in a way that provides high value labeling examples. This allows for finding pockets of new drifted data that the model has not seen before and export it to high value labeling.

For example, a computer-implemented method for optimizing a machine learning model is disclosed. The method can include: obtaining one or more embedding vectors based on a prediction of a machine learning model; mapping the embedding vectors from a higher dimensional space to a two- or three-dimensional space to generate one or more high density points in the two- or three-dimensional space, each high-density point including at least one of the embedding vectors; clustering the high-density points by running a clustering algorithm multiple times, each time with a different set of parameters to generate one or more clusters; applying a purity metric to each cluster to generate a normalized purity score of each cluster; identifying one or more clusters with a normalized purity score lower than a threshold; and optimizing the machine learning model based on the identified one or more clusters.

In an example embodiment, the optimizing of the machine learning model may comprise training the machine learning model based on vectors in the identified clusters. In an example embodiment, the optimizing of the machine learning model may comprise mapping the identified clusters in the two- or three-dimensional space back to the higher dimensional space; generating a high dimensional Hyperbox by projecting vectors from the clusters in the higher dimensional space; and training the machine learning model based on vectors contained within the Hyperbox.

In example embodiments, the mapping of the embedding vectors is based on Uniform Manifold Approximation and Projection for Dimension Reduction (UMAP). The clustering is based on a HDBScan clustering algorithm. The clusters are identified based on a run of the clustering algorithm that maximizes a total number of clusters. The machine learning model is based on unstructured image data and/or unstructured natural language data. A purity score of a cluster is based on a ratio of the total number of high-density points in a training environment and the total number of high-density points in a production environment. The purity score is normalized based on a ratio of the total number of points in the training and production environments to generate the normalized purity score. The generating of the high dimensional Hyperbox comprises running a principal component analysis (PCA) on the vectors in the higher dimensional space. The vectors contained within the Hyperbox are exported for labeling.

A system for optimizing a machine learning model is also disclosed. The system can include a processor and an associated memory, the processor being configured for: obtaining one or more embedding vectors based on a prediction of a machine learning model; mapping the embedding vectors from a higher dimensional space to a two- or three-dimensional space to generate one or more high density points in the two- or three-dimensional space, each high-density point including at least one of the embedding vectors; clustering the high-density points by running a clustering algorithm multiple times, each time with a different set of parameters to generate one or more clusters; applying a purity metric to each cluster to generate a normalized purity score of each cluster; identifying one or more clusters with a normalized purity score lower than a threshold; and optimizing the machine learning model based on the identified one or more clusters.

BRIEF DESCRIPTION OF DRAWINGS

Other objects and advantages of the present disclosure will become apparent to those skilled in the art upon reading the following detailed description of example embodiments, in conjunction with the accompanying drawings, in which like reference numerals have been used to designate like elements, and in which.

DESCRIPTION

The present disclosure provides embedding drift techniques that can track a data drift in a machine learning model that is based on unstructured data. In an example embodiment, the machine learning model generates predictions on data that differs based on the environment (e.g., training environment vs production environment). Because of different data, clusters generated in production can be different than the clusters generated in the training environment. The present techniques allow for detecting new clusters generated in production and creating a sorted stream of high value points for labeling.

Figure 1:
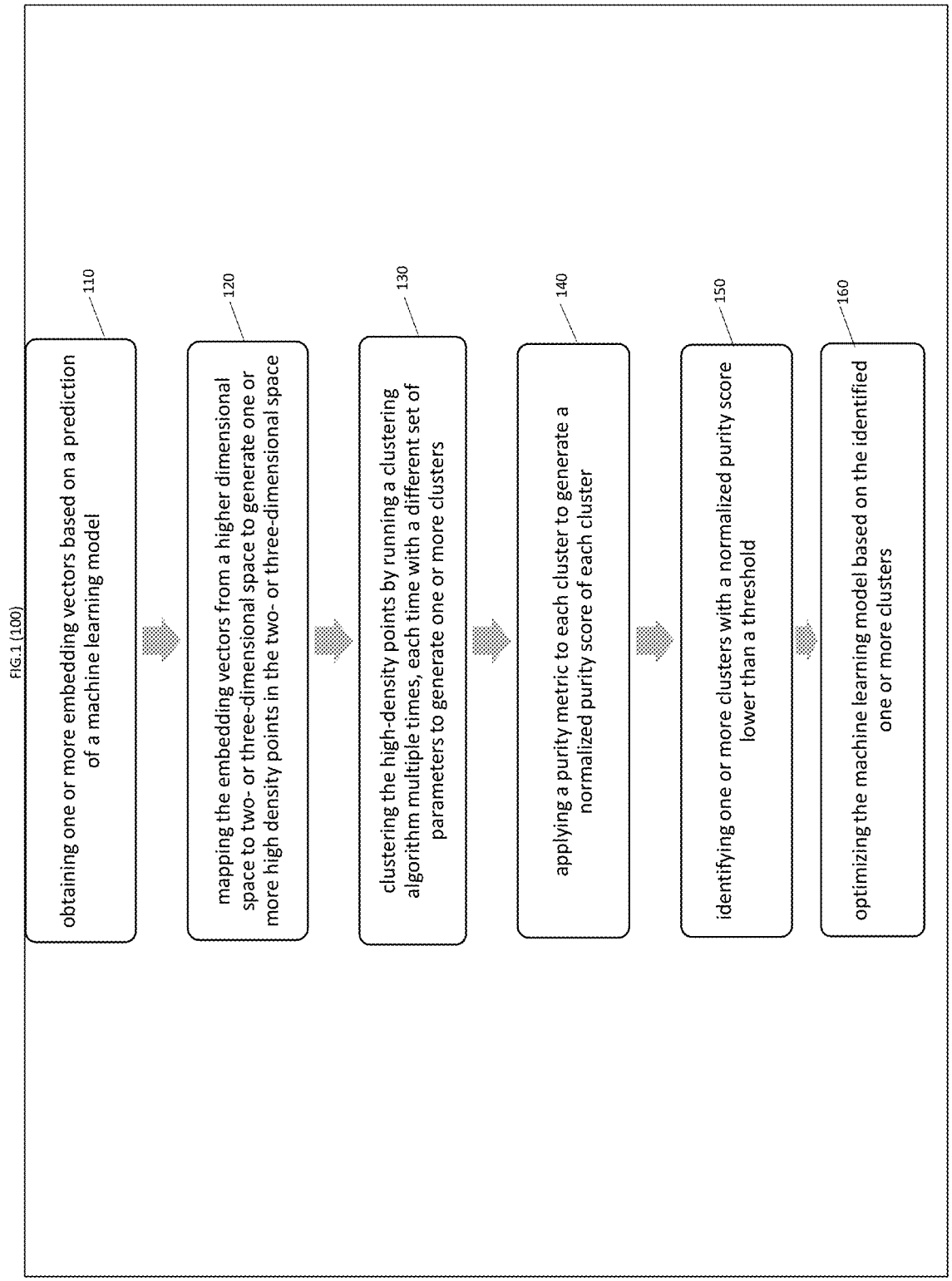
FIG. 1 shows a flowchart of a method for determining the embedding drift metric in a machine learning model according to an example embodiment of the present disclosure.

FIG. 1 shows a flowchart of an example method 100 with steps for performing these techniques. The method 100 can include a step 110 of obtaining one or more embedding vectors based on a prediction of a machine learning model; a step 120 of mapping the embedding vectors from a higher dimensional space to a two- or three-dimensional space to generate one or more high density points in the two- or three-dimensional space, wherein each high-density point includes at least one of the embedding vectors; a step 130 of clustering the high-density points by running a clustering algorithm multiple times, each time with a different set of parameters to generate one or more clusters; a step 140 of applying a purity metric to each cluster to generate a normalized purity score of each cluster; a step 150 of identifying one or more clusters with a normalized purity score lower than a threshold; and a step 160 of optimizing the machine learning model based on the identified one or more clusters. Each of these steps are subsequently described in detail.

Although the steps 110-160 are illustrated in sequential order, these steps may also be performed in parallel, and/or in a different order than the order disclosed and described herein. Also, the various steps may be combined into fewer steps, divided into additional steps, and/or removed based upon a desired implementation.

At step 110, one or more embedding vectors based on a prediction of a machine learning model can be obtained. An embedding vector is a vector of information that can be extracted from a model based on the activations at a specific layer of the model. In example embodiments, the embedding vectors can be obtained from an external or internal source (e.g., from a memory device, a network connection, etc.), or extracted as explained below.

In an example embodiment, the embedding vectors can be obtained at a certain timestamp or time period, e.g., when predictions of the model are at a baseline level of accuracy, which can be defined according to the type of model (e.g., an image-based model, NLP based model, etc.). The baseline level of accuracy can be changed/updated during the training or based on the model's performance in production. In an example embodiment, one or more embedding vectors can be grouped by their environment (i.e., vectors from training, validation, or production set) or metadata. Further, one or more embedding vectors can also be grouped based on a combination of their timestamp, environment, and metadata.

In an example embodiment, the embedding vectors of step 110 can be extracted using known methods, e.g., as described in https://beta.openai.com/docs/guides/embeddings (accessed Mar. 16, 2022) or https://www.pinecone.io/learn/vector-embeddings/ (accessed Mar. 16, 2022), which are incorporated by reference. The extracted embedding vectors can be in a high dimensional space.

The embedding vectors can be filtered by applying filtering criteria (e.g., removing False Positives and/or False negatives) based on a slice (i.e., a subset) of the model's second predictions. Techniques described in application Ser. No. 17/212,202 for generating a slice and filtering can be used. The filtering can be optional to be used in cases where FPs and/or FNs need to be removed.

At step 120, the embedding vectors are mapped from a high-dimensional space into a two- or three-dimensional space to generate one or more high density points in the two- or three-dimensional space such that each high-density point includes at least one of the embedding vectors. The mapping of embedding vectors described in step 120 can be performed in both the production and training environments.

Uniform Manifold Approximation and Projection for Dimension Reduction (UMAP) techniques, as described in https://umap-learn.readthedocs.io/en/latest/ can be used for dimensionality reduction to generate clusters based on manifolds (structure mapped out by vectors) that exist in the high dimensional data to perform step 120. Such techniques overcome the problems associated with creating clusters in in the high dimensional space, e.g., either too much data is selected that is unrelated, or very sparse data is exported.

Figure 2:
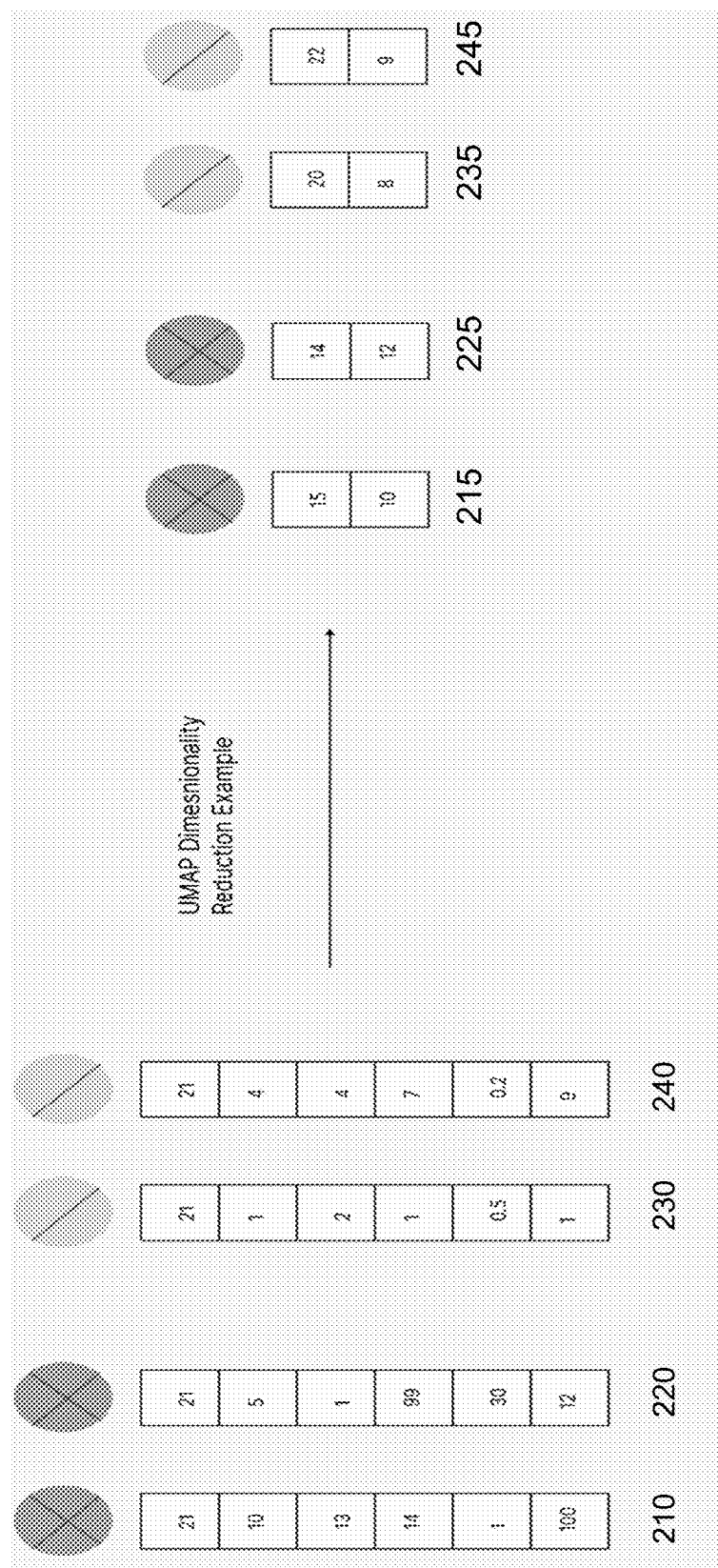
FIG. 2 illustrates a mapping of high dimensional embedding vectors to a two-dimensional space according to an example embodiment of the present disclosure.

FIG. 2 illustrates a mapping of high dimensional embedding vectors to a two-dimensional space. The curse of dimensionality can be countered by mapping the high dimensional vectors into a lower dimensional space, such as 2D or 3D with the goal of projecting the surfaces and structure from the high dimensional space to a lower dimensional space where the can be easily clustered.

As illustrated in FIG. 2, six-dimensional vectors 210 (21, 10, 13, 14, 1, 100) and 220 (21, 5, 1, 99, 30, 12) are mapped to 2D vectors 215 (15, 10) and 225 (14, 12), respectively. Further, six-dimensional vectors 230 (21, 1, 2, 1, 0.5, 1) and 240 (21, 4, 4, 7, 0.2, 9) are mapped to 2D vectors 235 (20, 8) and 245 (22, 9), respectively. Points that are close to each other in high dimensional space are close to each other in low dimensional space. Therefore, vectors 210 and 220 represented with a "x" are closer to each other in both high dimensional space (210 and 220) and low dimensional space (215 and 225). Similarly, vectors 230 and 240 represented with a "\" are closer to each other in both high dimensional space (230 and 240) and low dimensional space (235 and 245).

Figure 3:
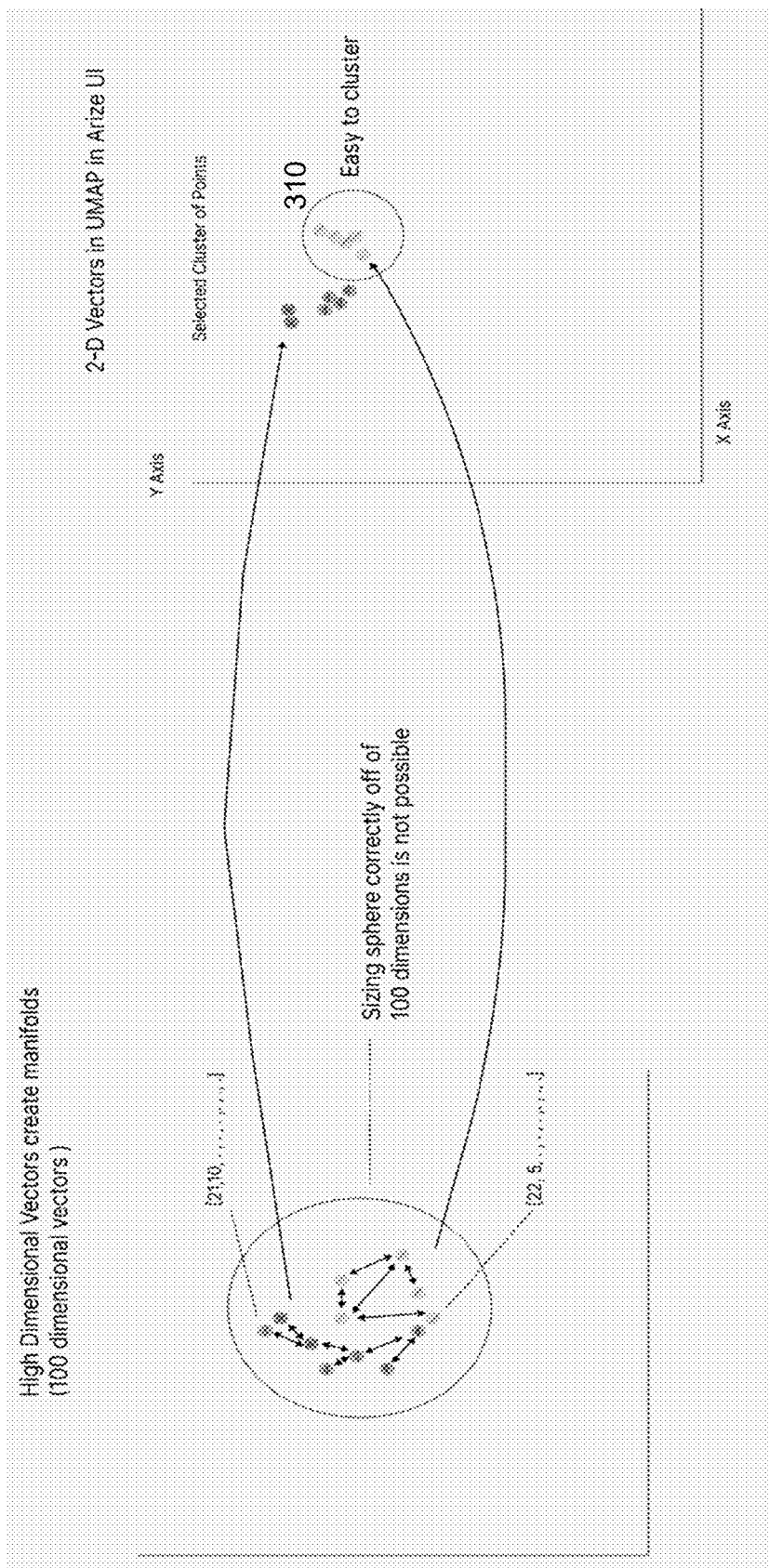
FIG. 3 illustrates clustering around the high-density points in a 2-D space according to an example embodiment of the present disclosure.
Figure 4A:
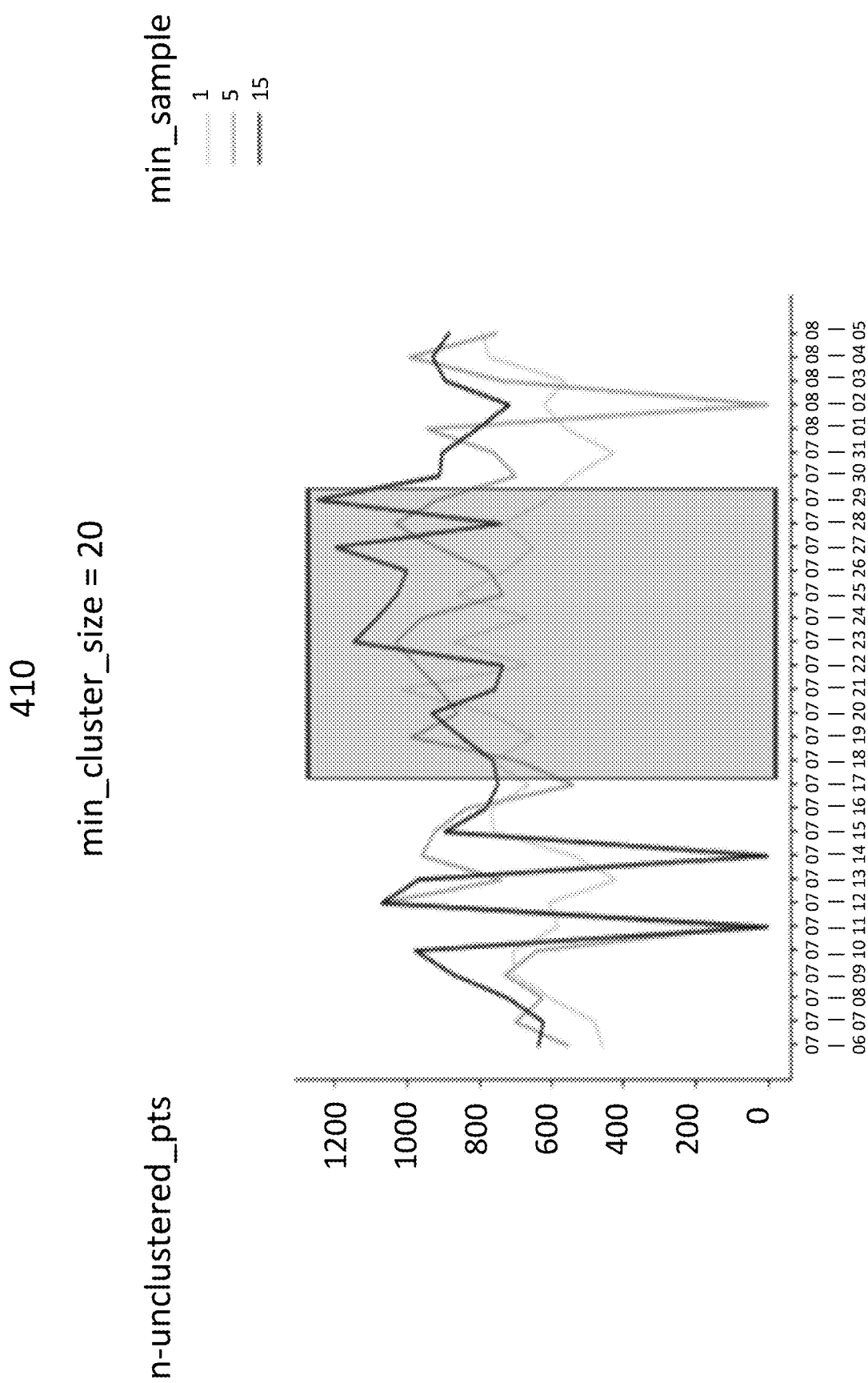
FIGS. 4A-4L show parallel clustering algorithms that are run on the lower dimensional and high-density points with varying parameters according to an example embodiment of the present disclosure.
Figure 4B:
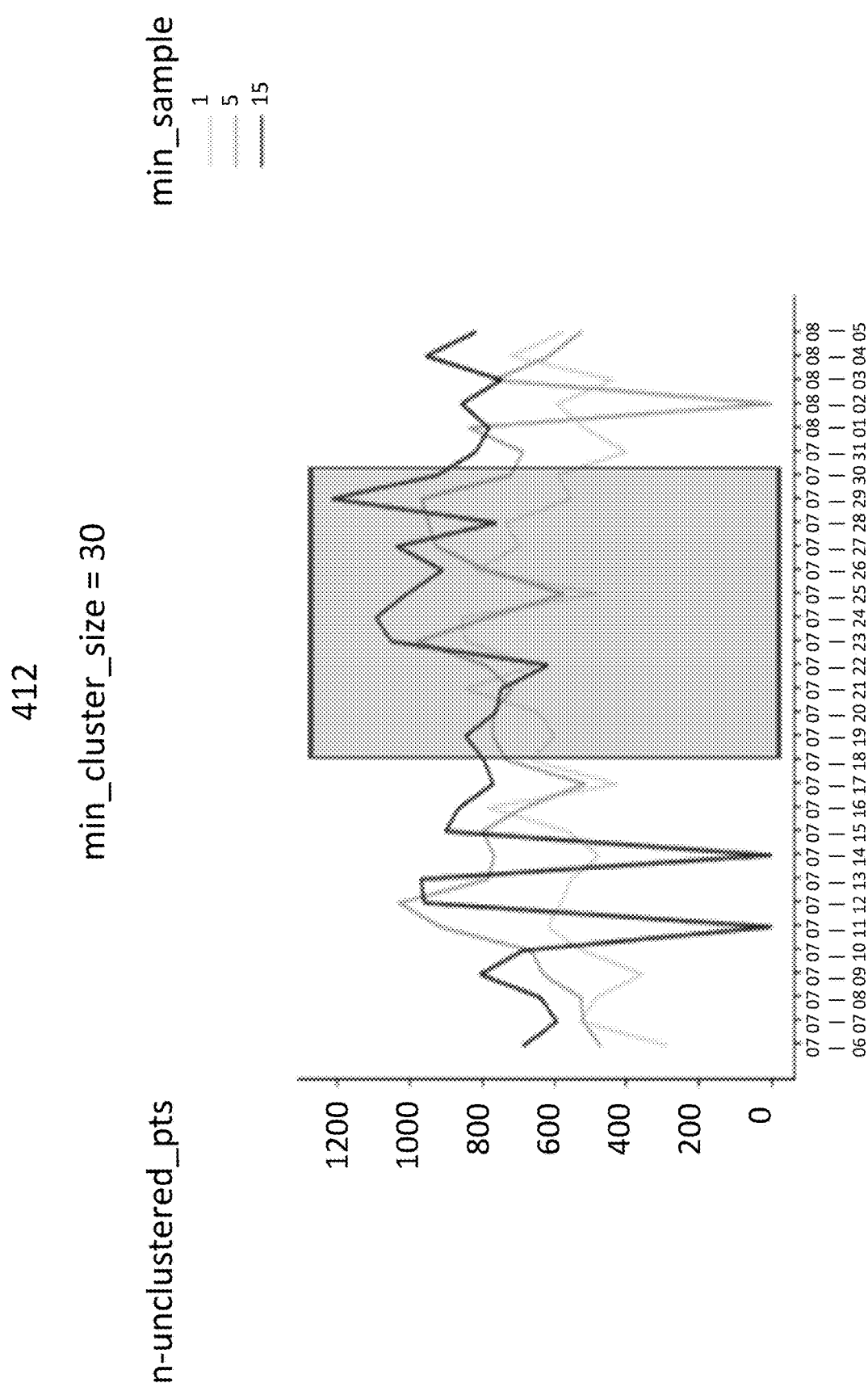
Figure 4C:
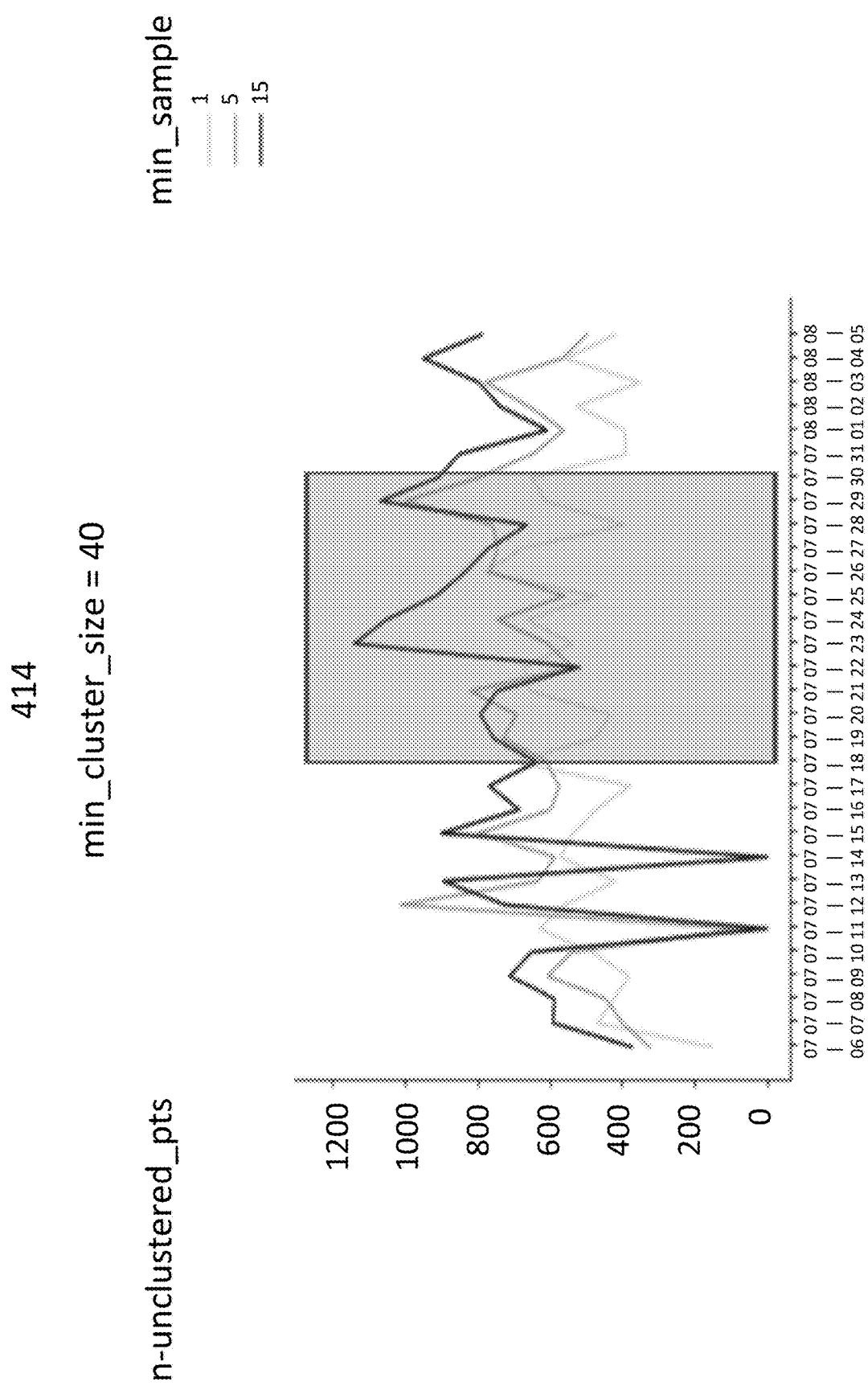
Figure 4D:
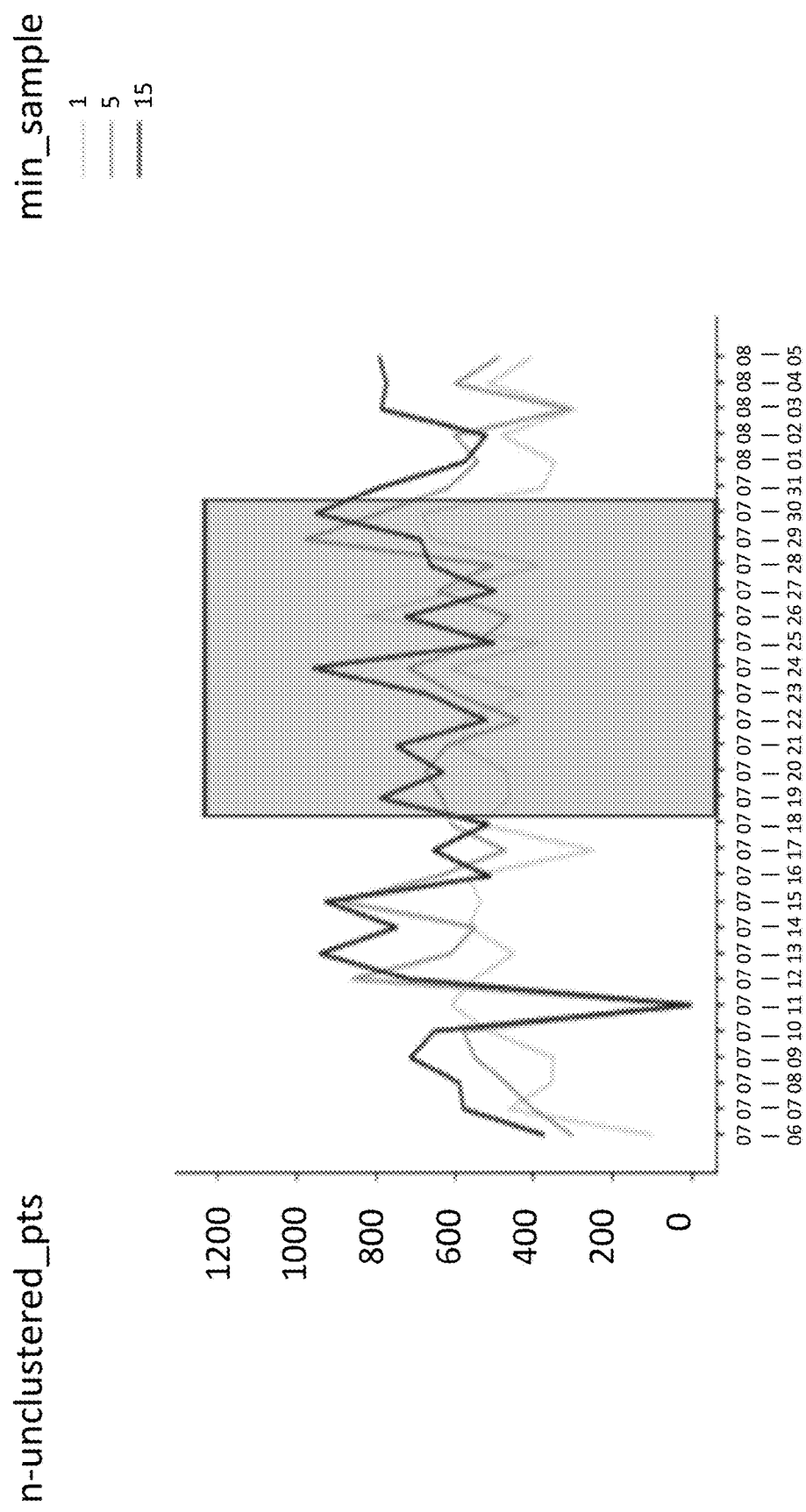
Figure 4E:
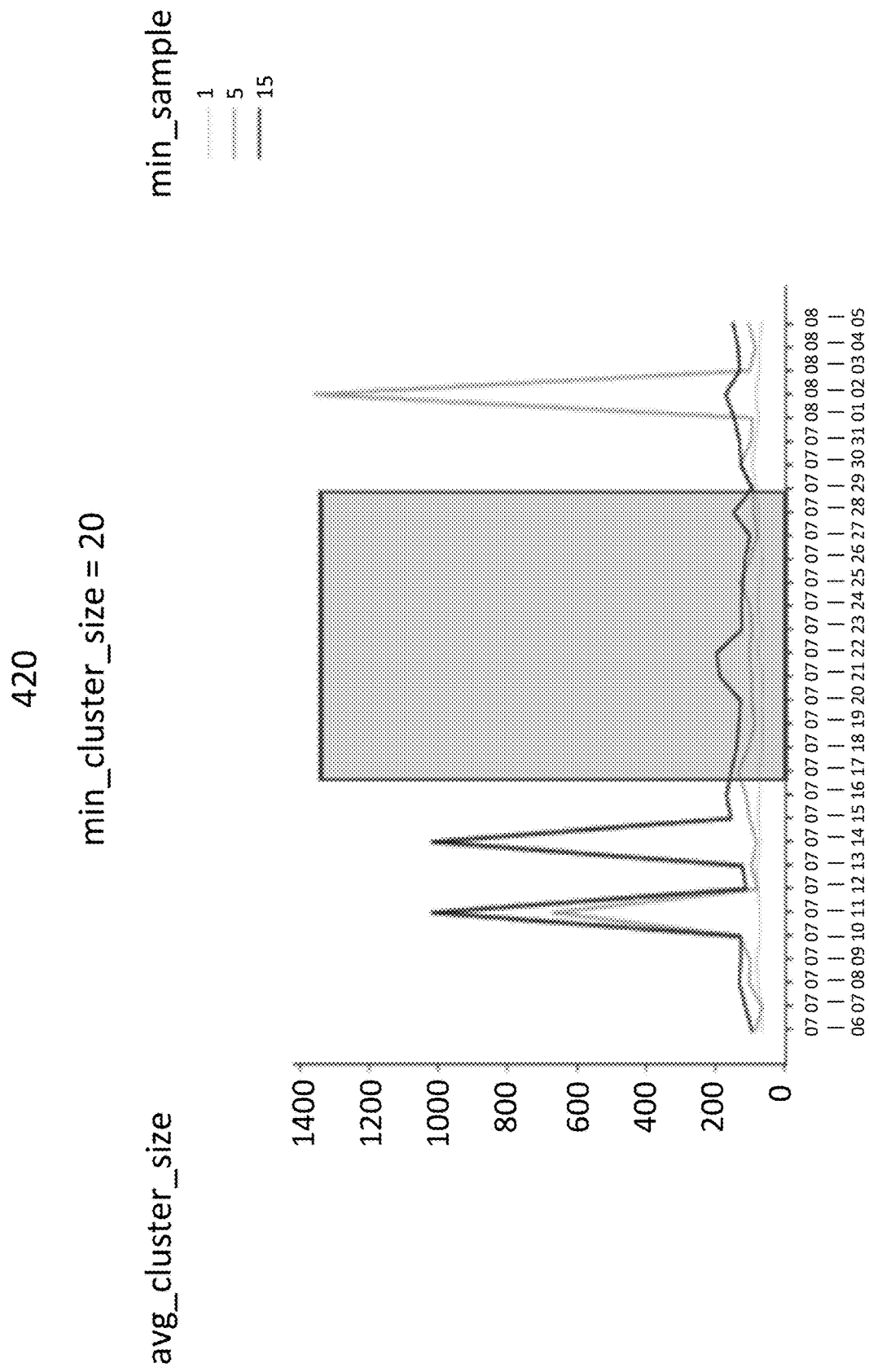
Figure 4F:
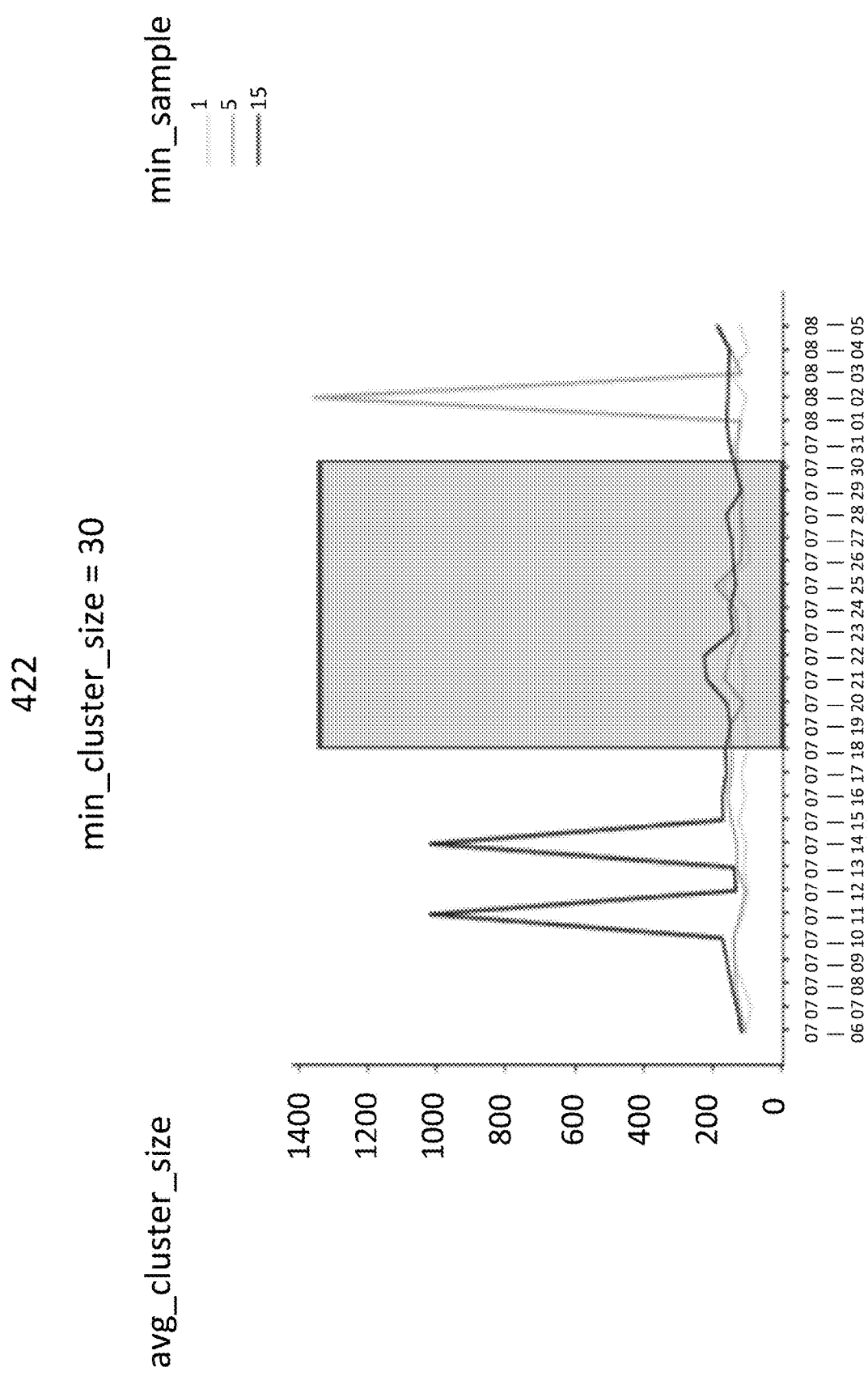
Figure 4G:
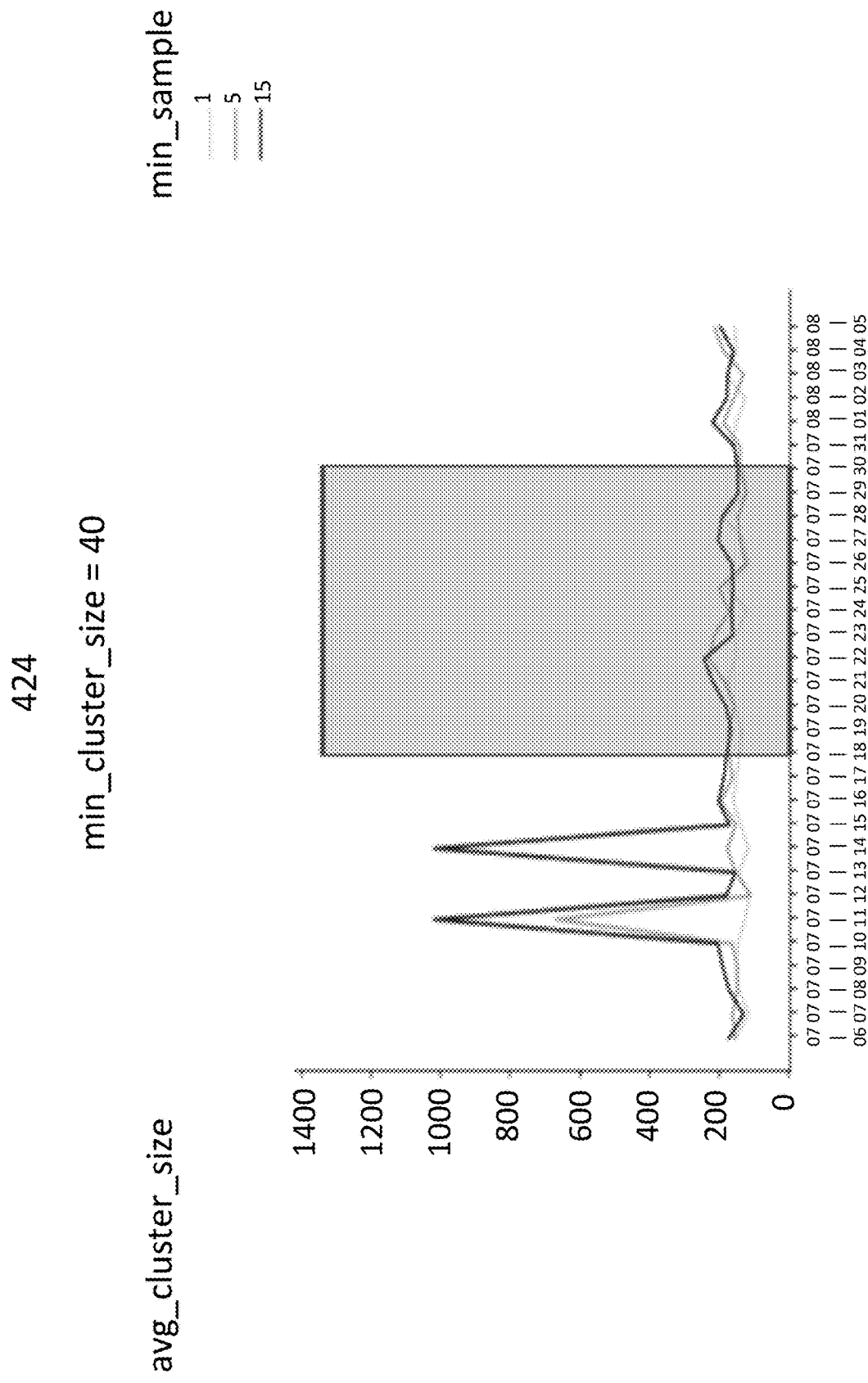
Figure 4H:
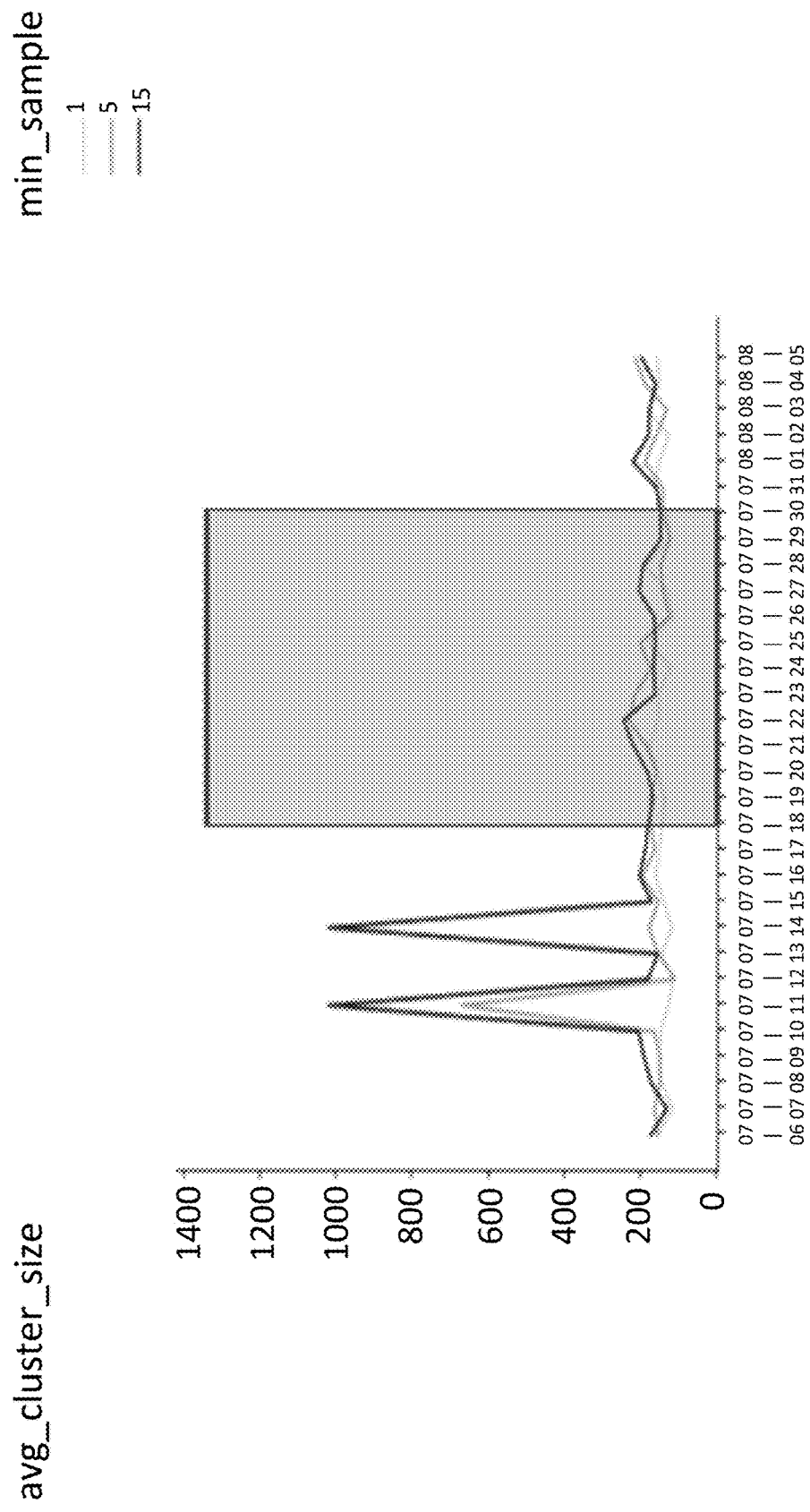
Figure 4I:
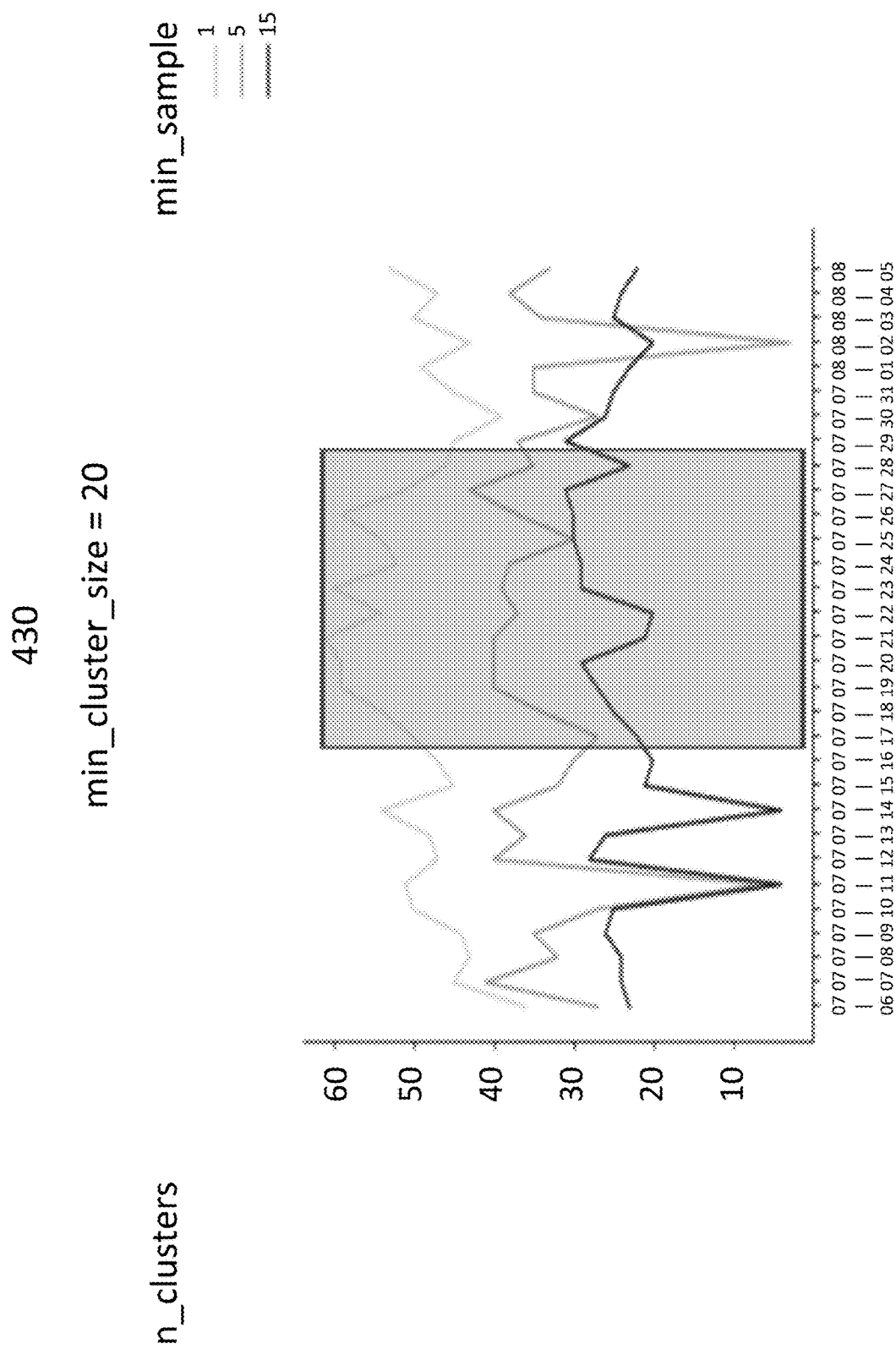
Figure 4J:
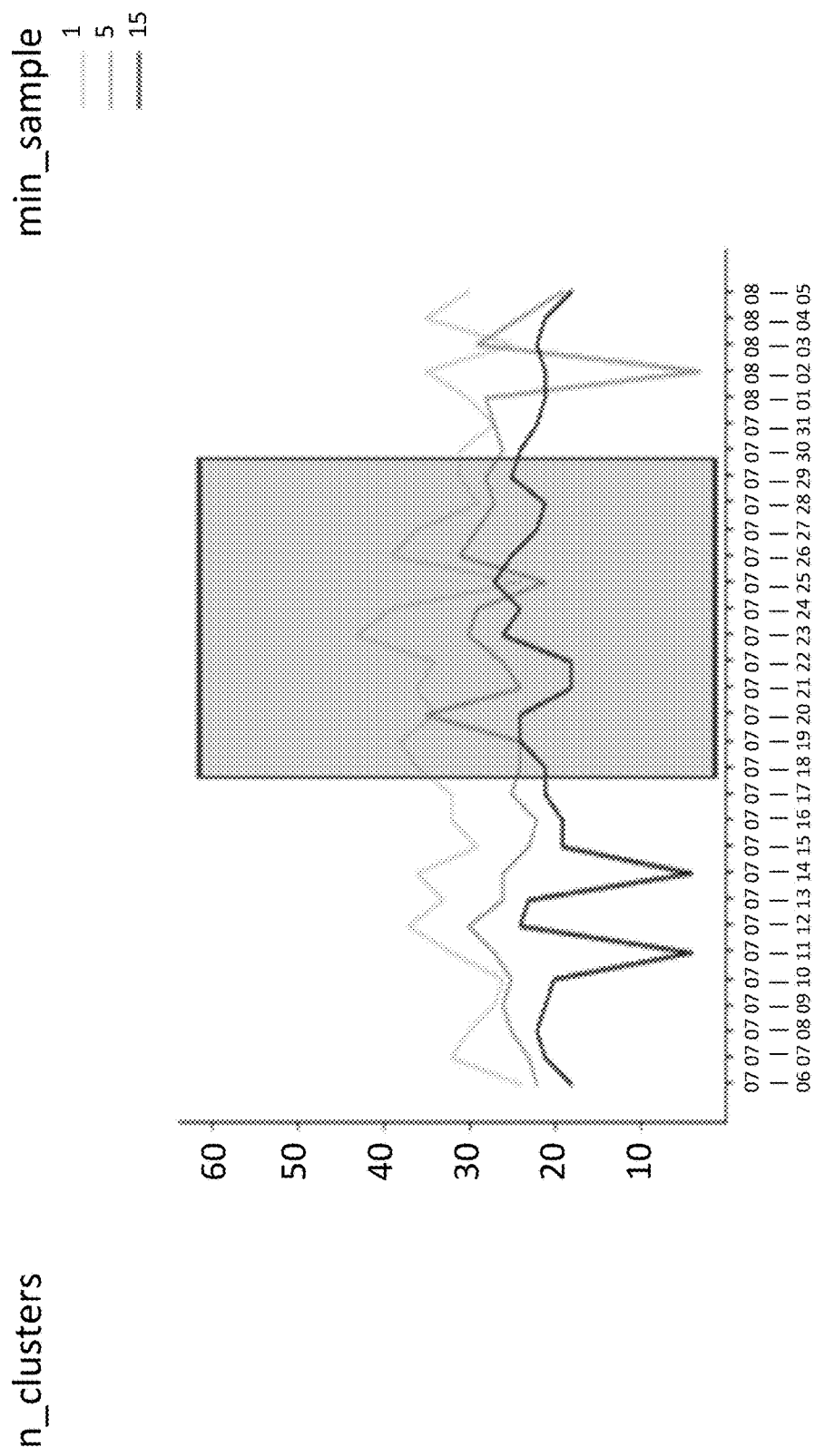
Figure 4K:
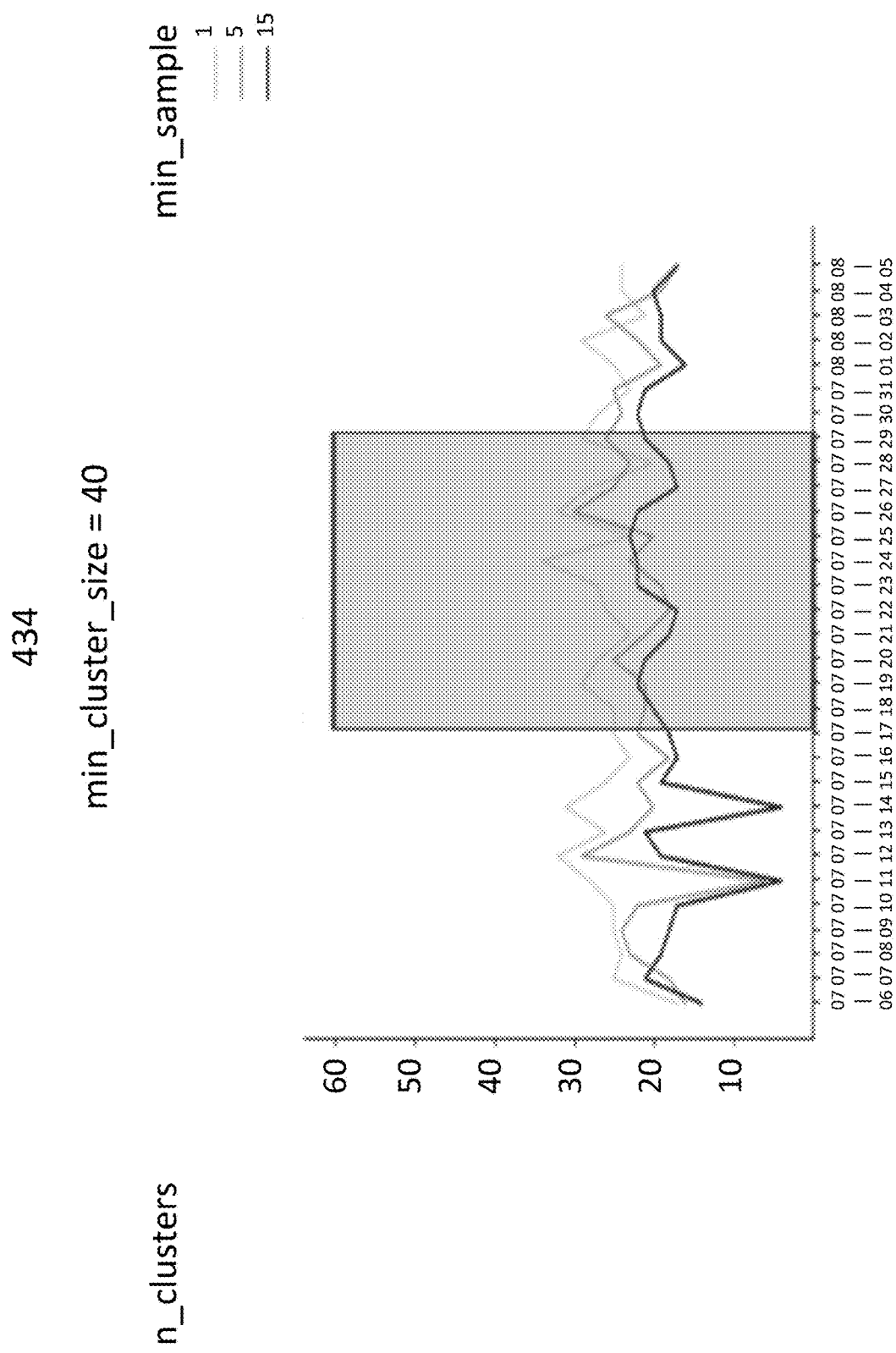
Figure 4L:
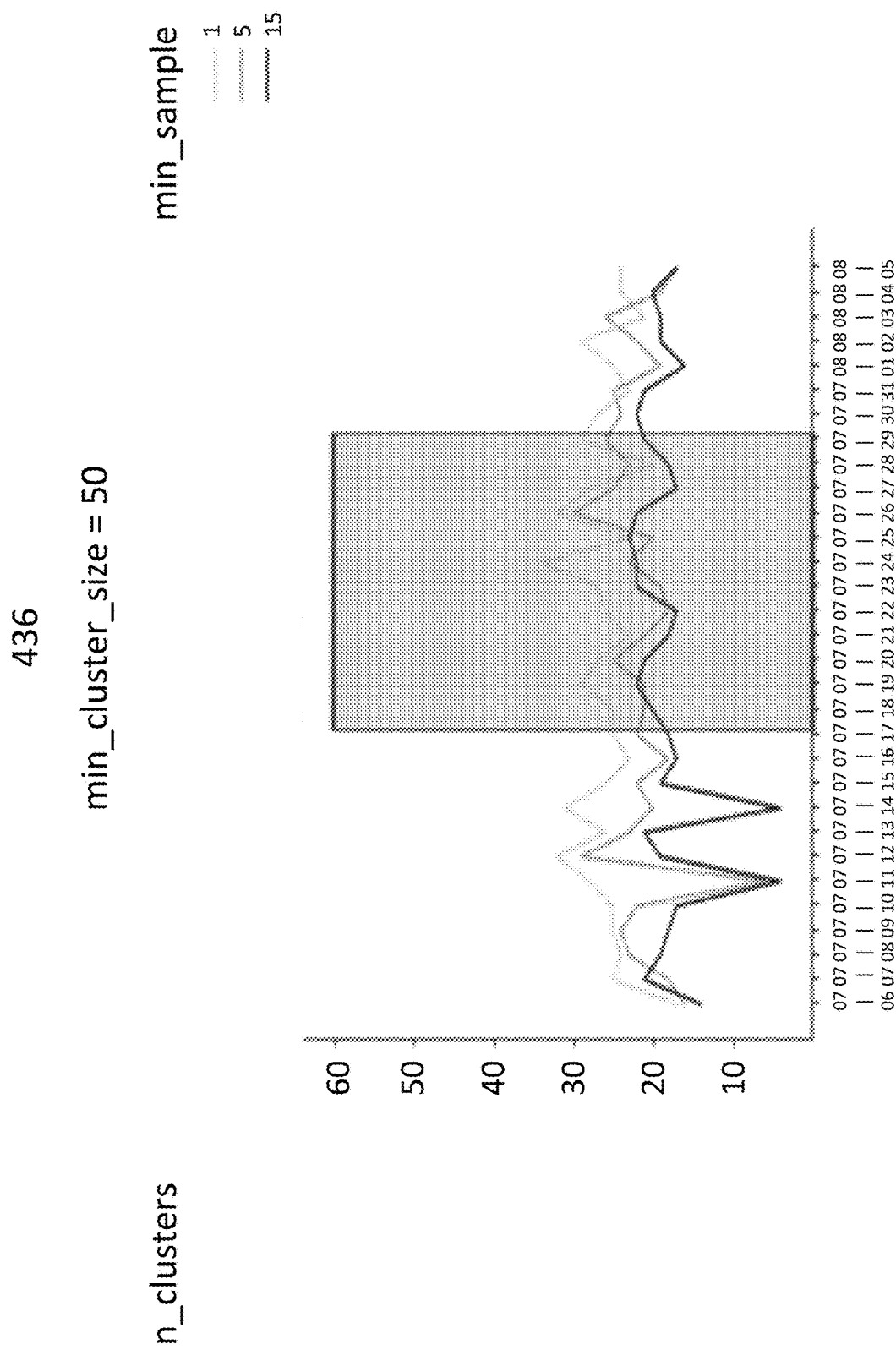

FIG. 3 shows a circle 310 drawn around the high-density points in a 2-D space to create clusters. Similarly, spheres can be drawn around the high-density points in 3-D space to create clusters. In an example embodiment, a UMAP technique configured for clustering can be designed to generate compacted groups of clusters. Using UMAP techniques for dimensionality reduction preserves vector structures (manifolds) in high dimensional space but maps it to a lower dimensional space. In an example embodiment, UMAP settings can be parameterized to optimize it for cluster generation. These settings are designed to allow and encourage points to map on top of each other.

At step 130, the lower dimensional and high-density points can be clustered by running a clustering algorithm multiple times with varying parameters to generate one or more clusters. The clustering algorithm (e.g., HDB Scan clustering) can be run each time with a different set of parameters to generate one or more clusters in both the production and training environments.

FIGS. 4A-4L show results of twelve clustering algorithms that are run on the lower dimensional and high-density points with parameters such as average cluster size, number of clusters, and the number of unclustered points. Results 410, 412, 414, and 416 show algorithms with different cluster sizes (20, 30, 40, 50 respectively) and the parameter being the number of unclustered points. Results 420, 422, 424, and 426 show algorithms with different cluster sizes (20, 30, 40, 50 respectively) and the parameter being the average cluster size. Results 430, 432, 434, and 436 show algorithms with different cluster sizes (20, 30, 40, 50 respectively) and the parameter being the number of clusters. In an example embodiment, these clustering algorithms can be run in parallel and runs that maximize the total number of clusters can be identified.

At step 140, a normalized purity score is generated for each cluster by applying a purity metric. In an example embodiment, a purity score of a cluster can be a ratio of the total number of high-density points in a training environment and the total number of high-density points in a production environment.

Figure 5:
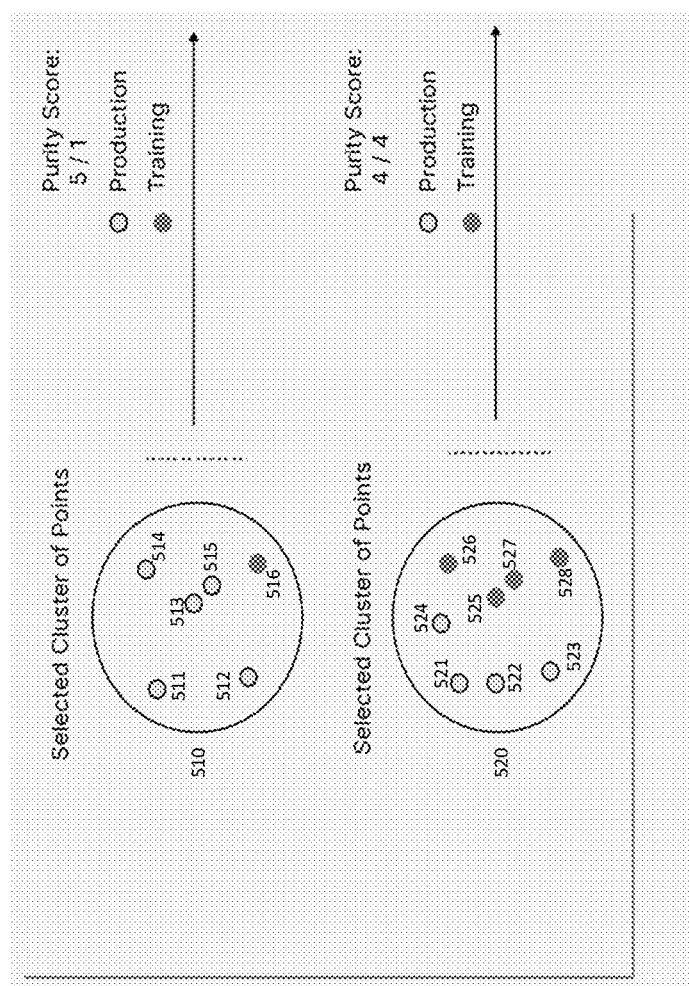
FIG. 5 shows example calculations of purity score according to an example embodiment of the present disclosure.
Figure 6A:
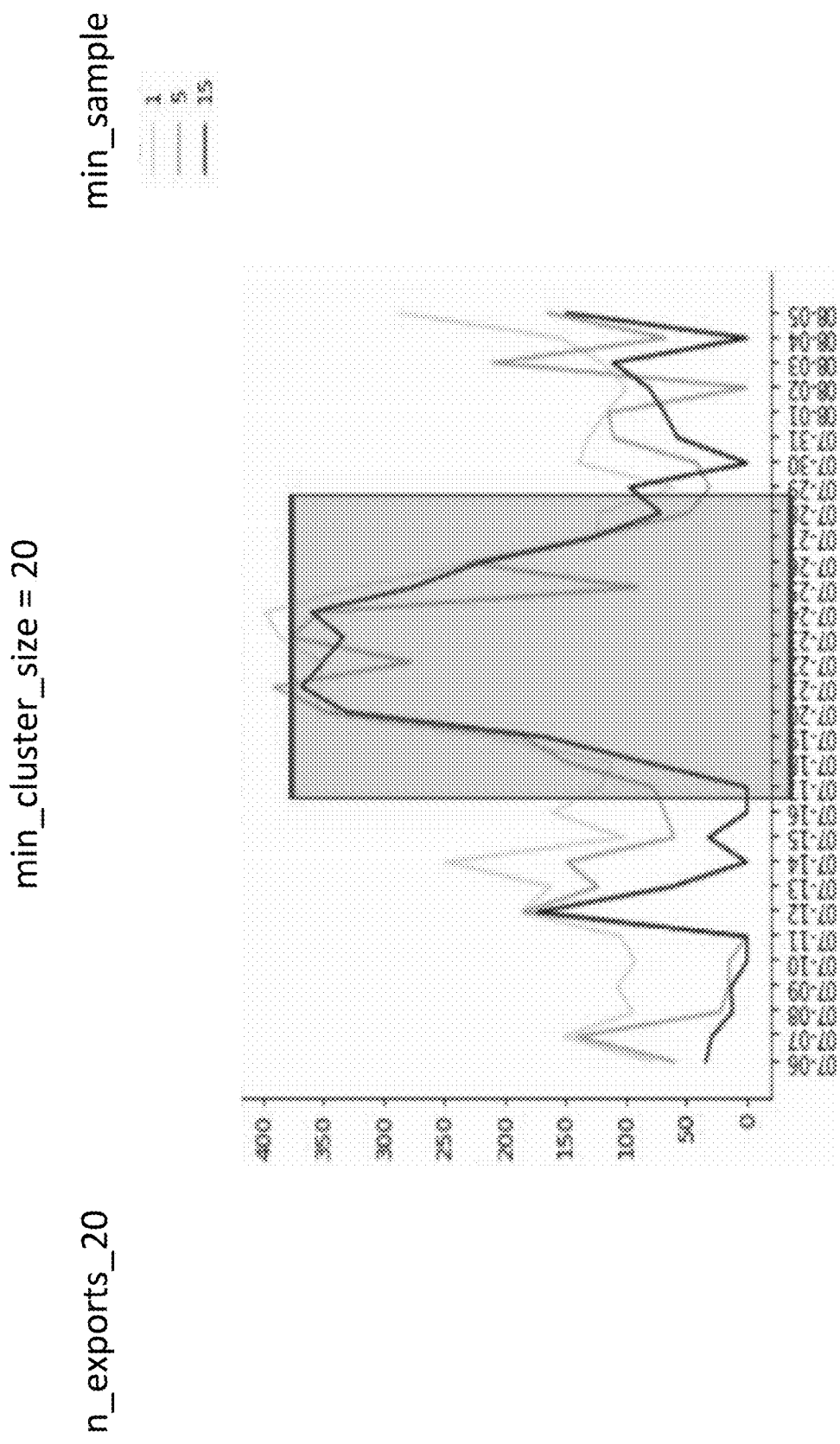
FIGS. 6A-6L show various points in a cluster that are exported over time according to an example embodiment of the present disclosure.
Figure 6B:
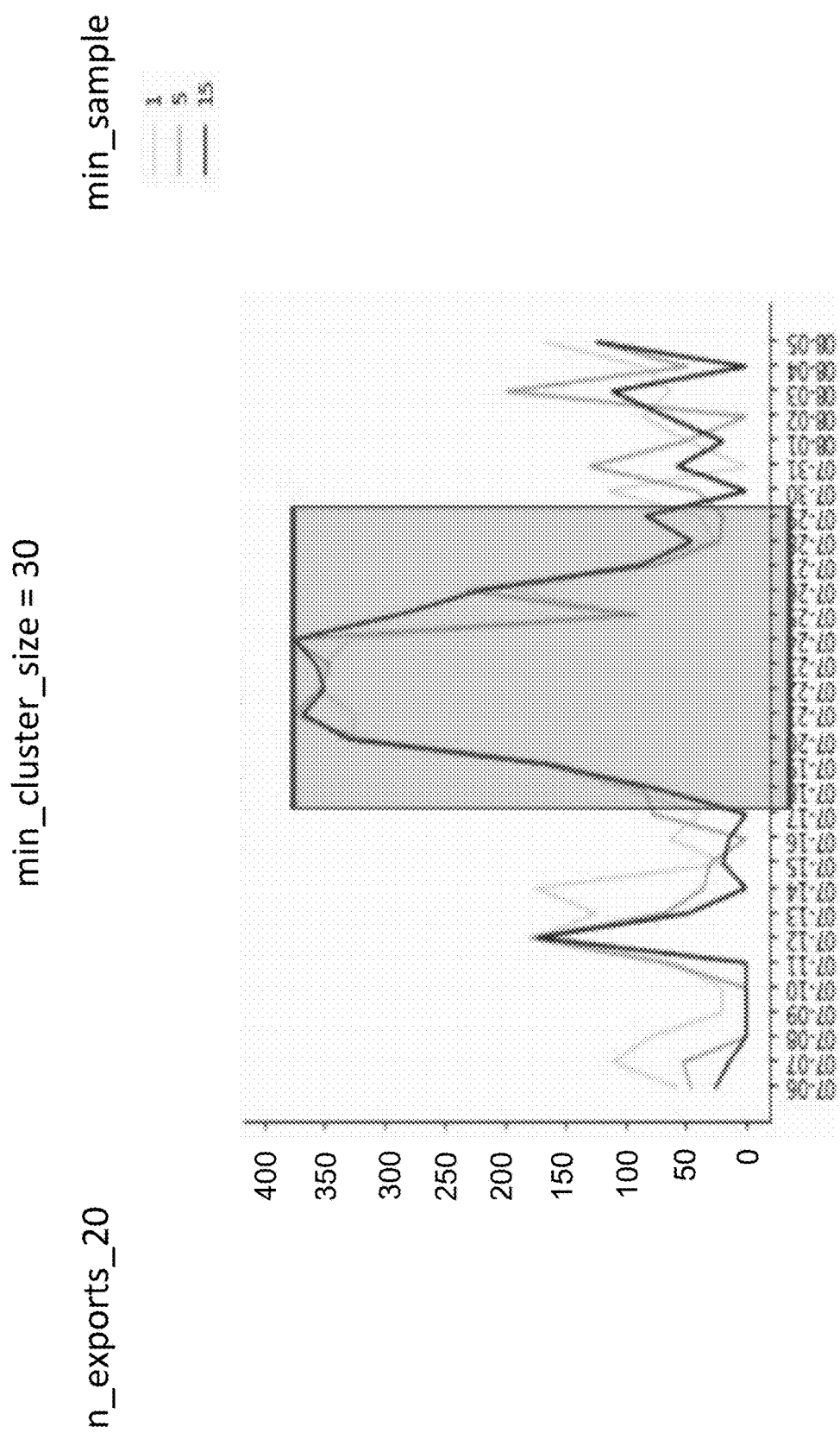
Figure 6C:
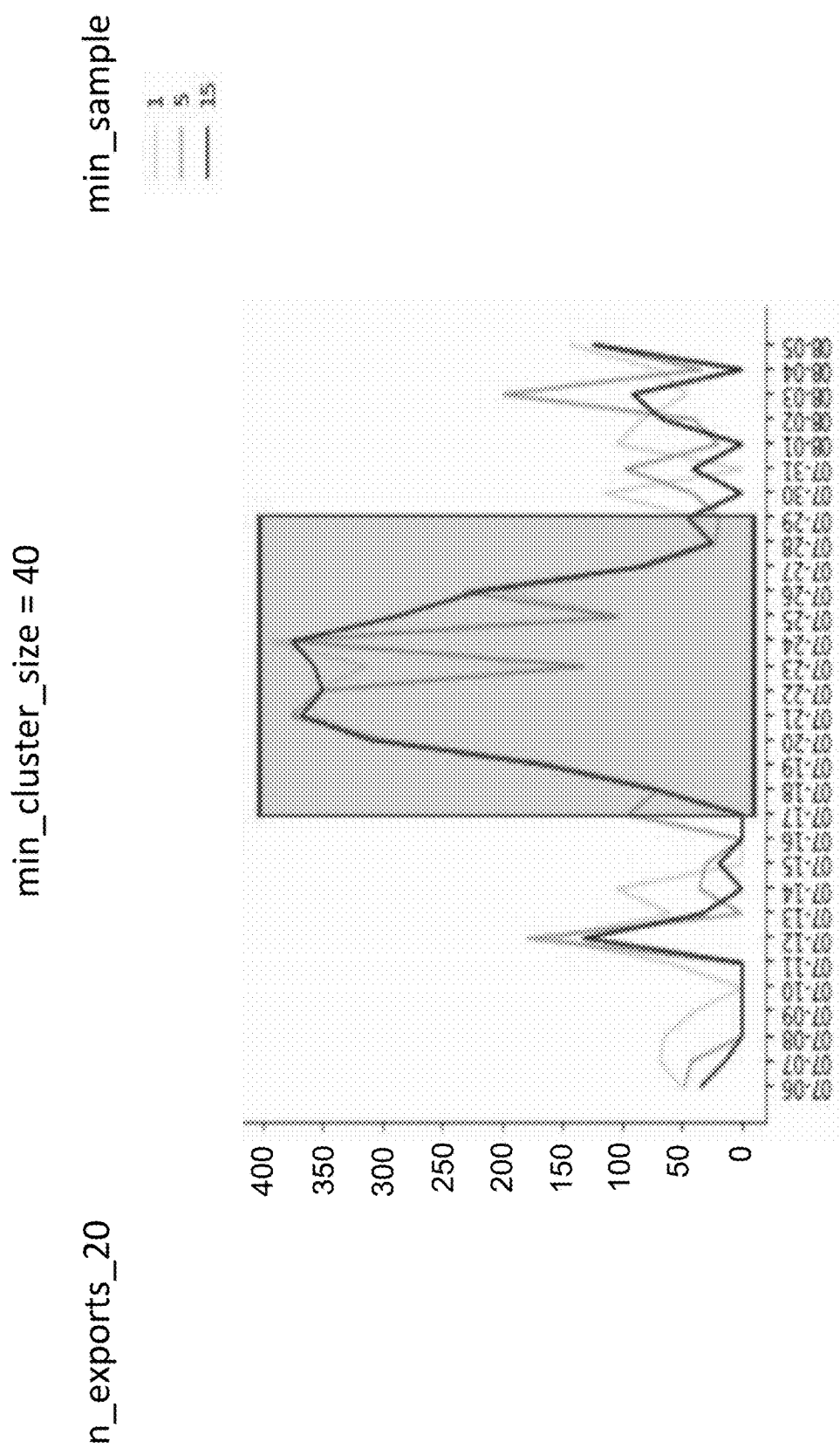
Figure 6D:
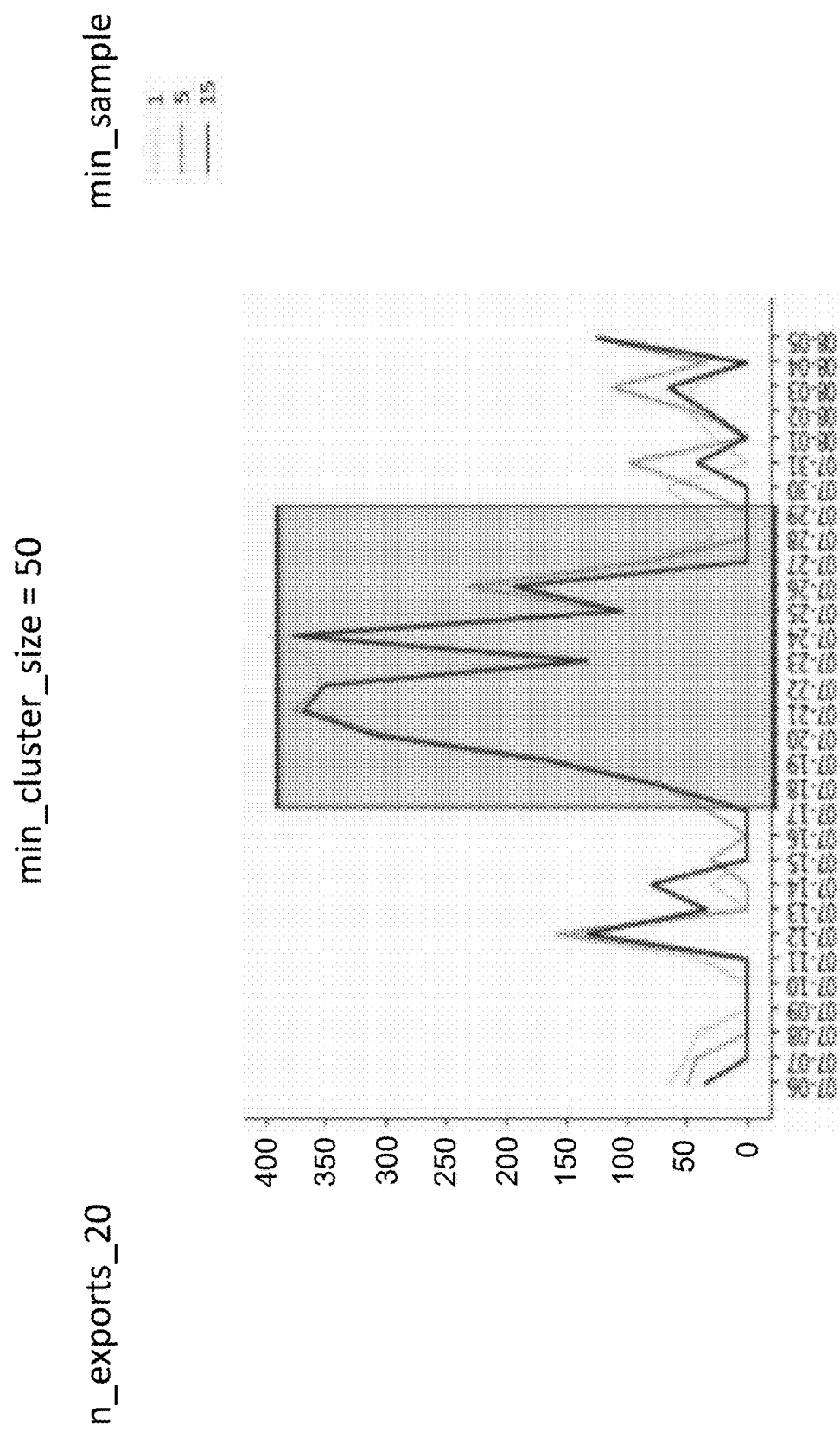
Figure 6E:
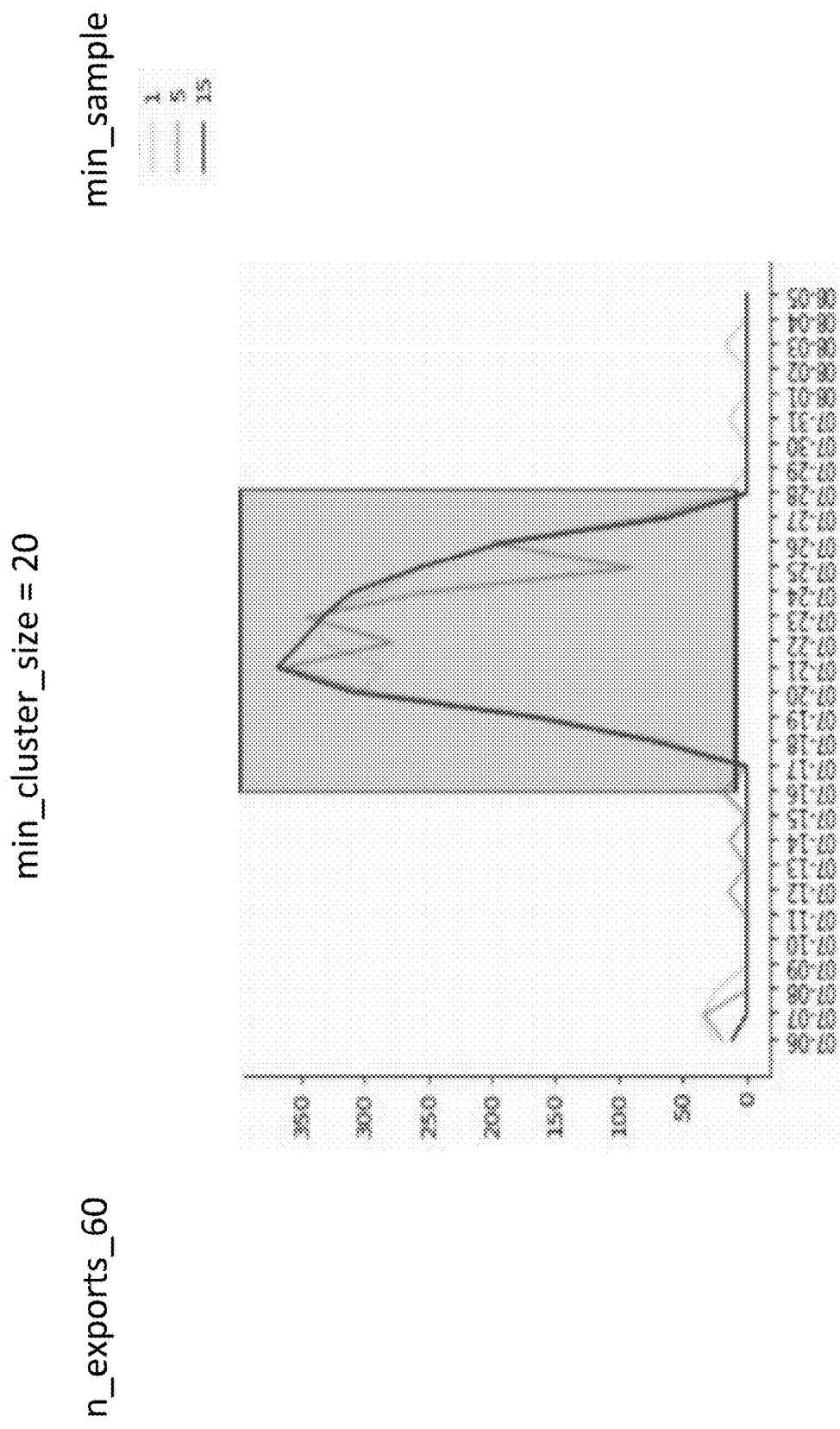
Figure 6F:
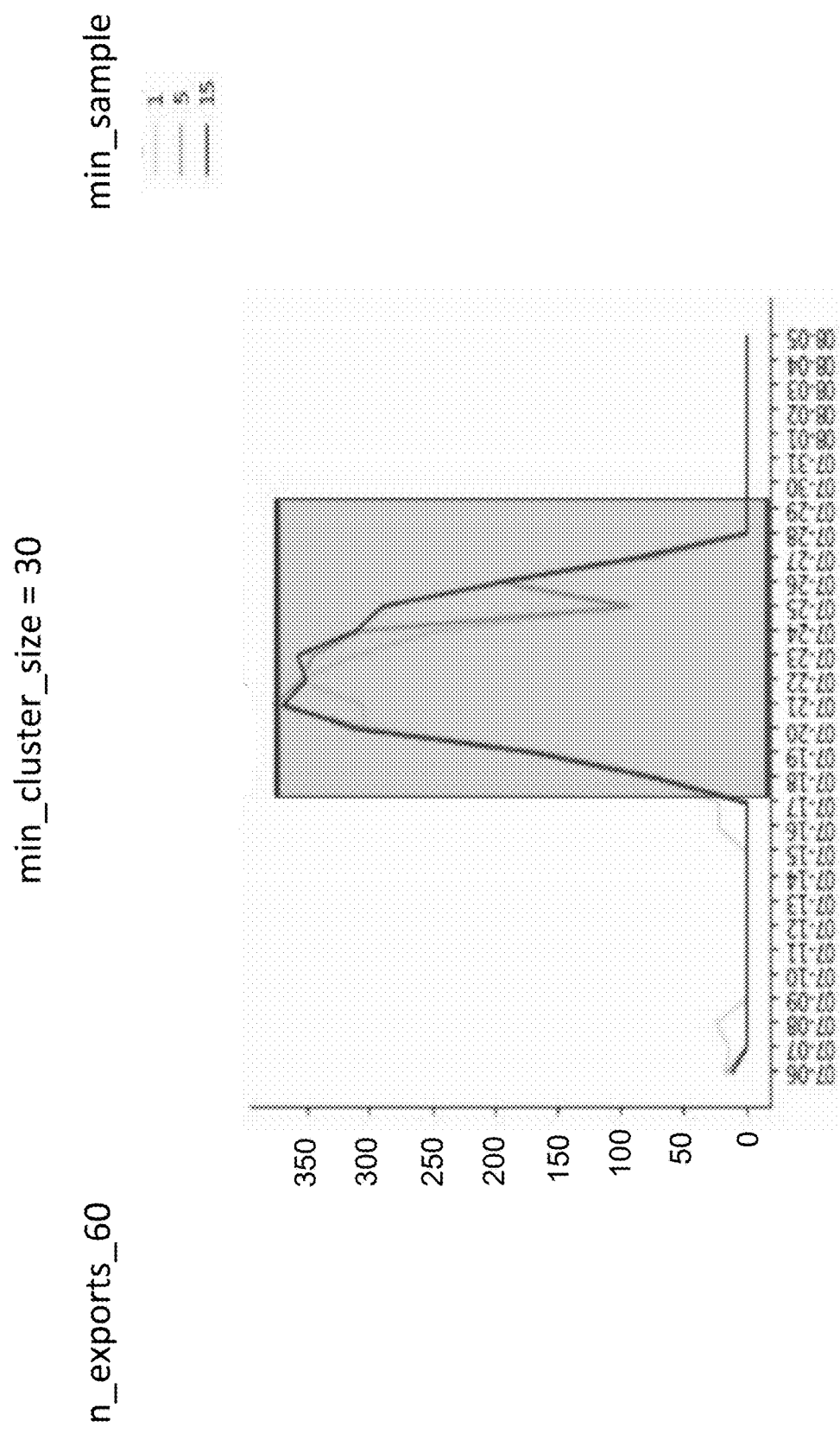
Figure 6G:
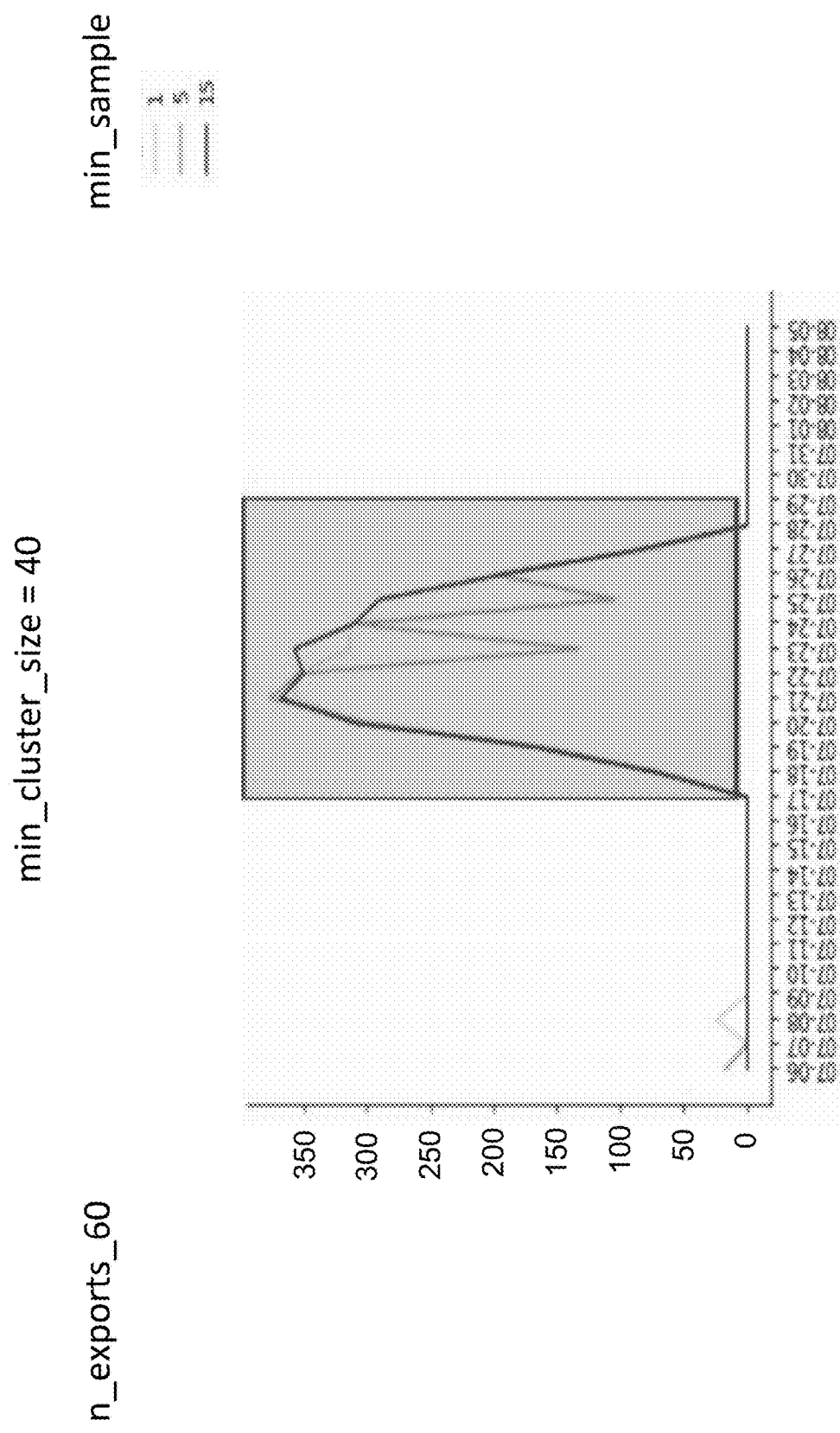
Figure 6H:
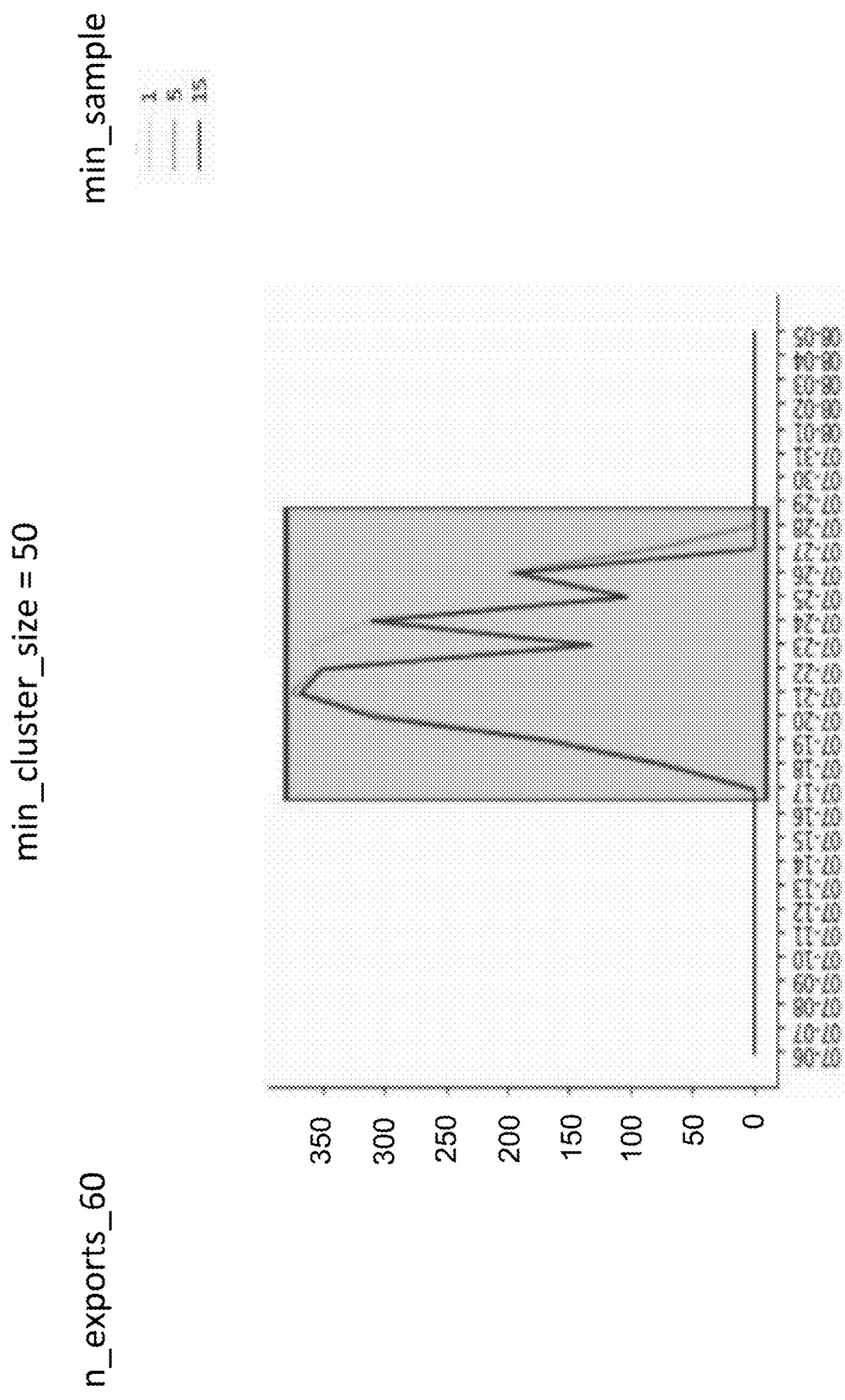
Figure 6I:
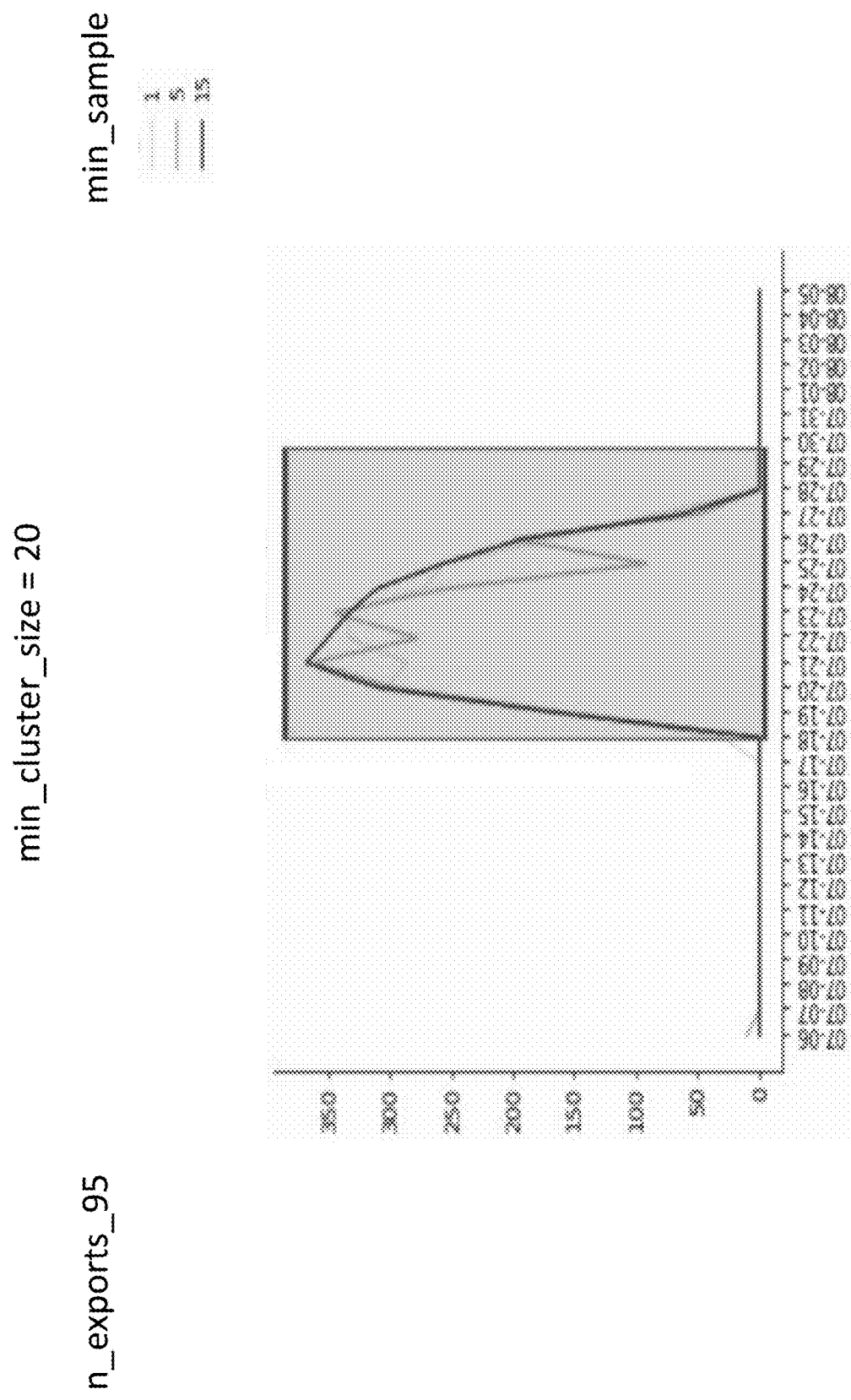
Figure 6J:
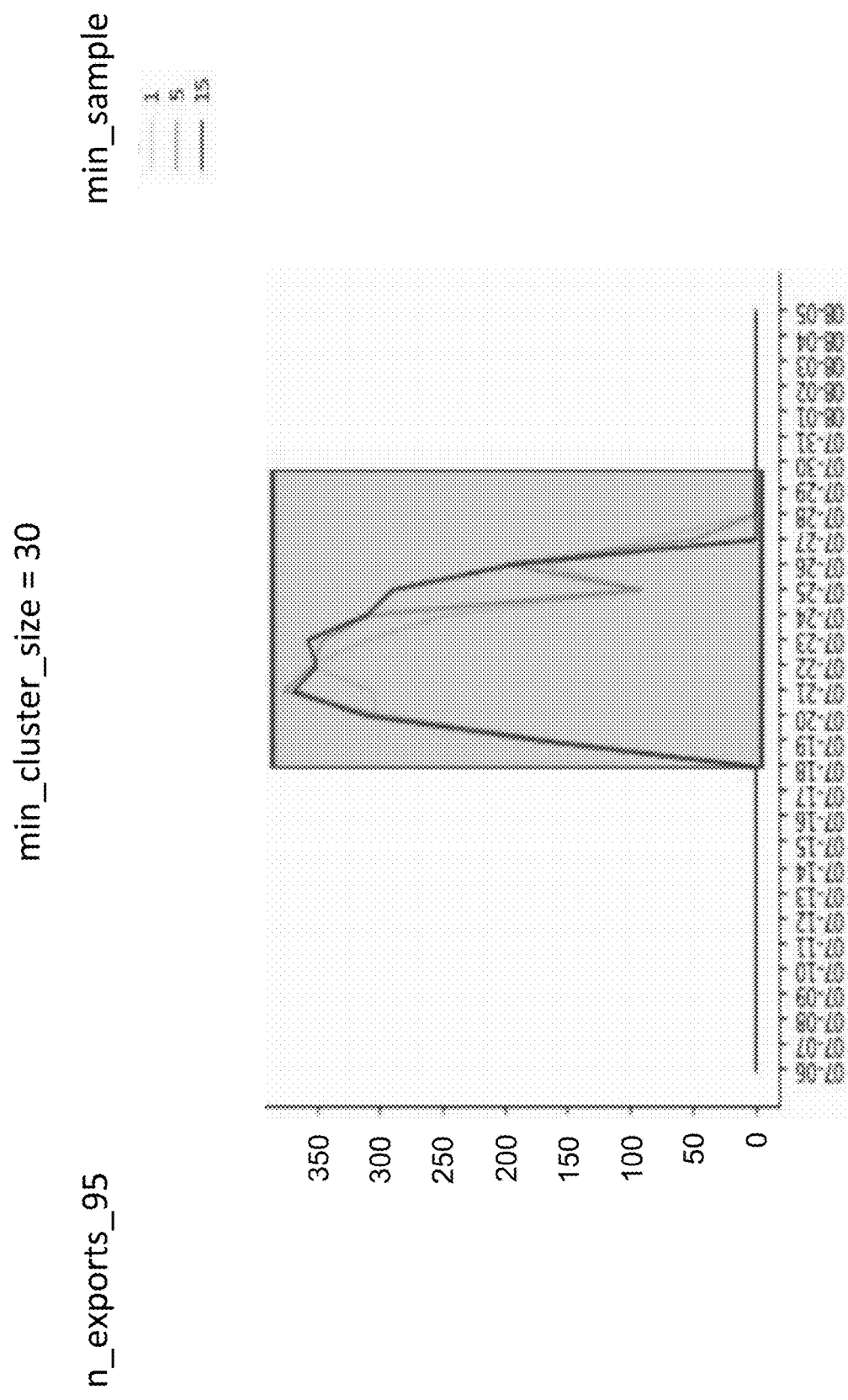
Figure 6K:
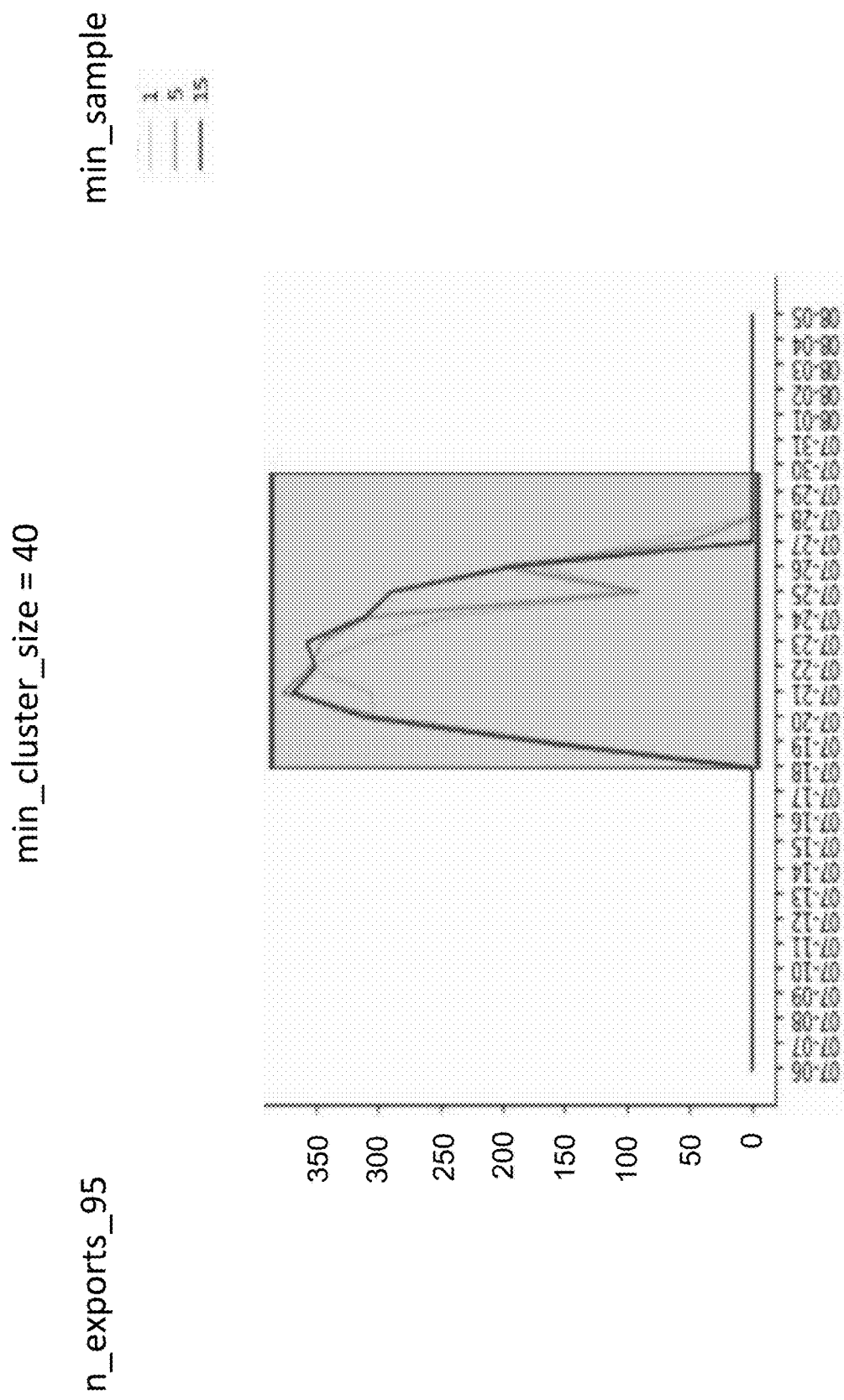
Figure 6L:
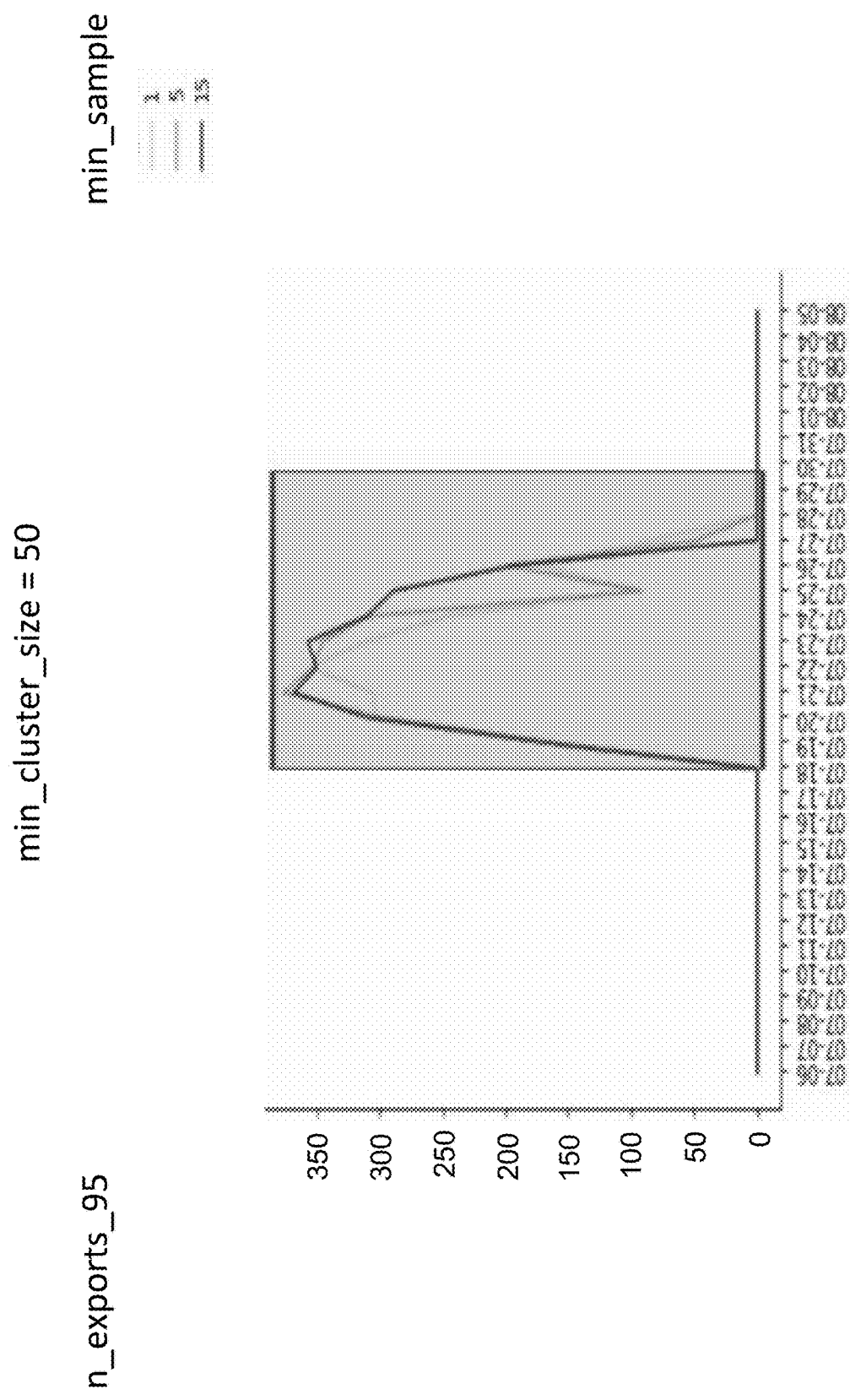

FIG. 5 shows example calculations of the purity score as described in step 140. In the cluster 510, there are a total of 5 points (511, 512, 513, 514, and 515) in production and a total of 1 point (516) in training. Therefore, the purity score for cluster 510 is calculated as 5/1. In the cluster 520, there are a total of 4 points (521, 522, 523, and 524) in production and a total of 4 points (525, 526, 527, and 528) in training. Therefore, the purity score for cluster 520 is calculated as 4/4.

In an example embodiment, the purity score may be normalized based on a ratio of the total number of points in the training and production environments. In the example of FIG. 5, between the two clusters 510 and 520, there are a total of 5 training data points and 9 production data points. Therefore, the purity score may be normalized by a factor of 5/9. As such, the normalized purity score for cluster 510 is $(5/1)*(5/9)=25/9=2.78$. The normalized purity score for cluster 520 is $(4/4)*(5/9)=5/9=0.56$. The normalizing of the purity score in step 140 can be optional. In cases where the normalizing is not performed, the rest of the calculation in the present disclosure can be based on the raw purity score (i.e., purity score without normalization).

At step 150, one or more clusters with a normalized purity score (or purity score without normalization) lower than a threshold can be identified and exported for labeling. In the previous example, if the threshold is 1, the cluster 520 with the normalized purity score of 0.56 is identified for labeling and exporting. FIGS. 6A-6L show various points in a cluster that can be exported over time and can be used to optimize the machine learning model as subsequently explained in detail.

At step 160, the machine learning model can be optimized based on the clusters identified in step 150. In an example embodiment, the machine learning model can be optimized by training the model based on vectors in the identified clusters. Continuing with the previous example, because cluster 520 was identified as having a normalized purity score (or purity score without normalization) lower than a threshold, the machine learning model can be trained on the vectors contained in the cluster 520. This training can optimize the machine learning model.

Figure 7:
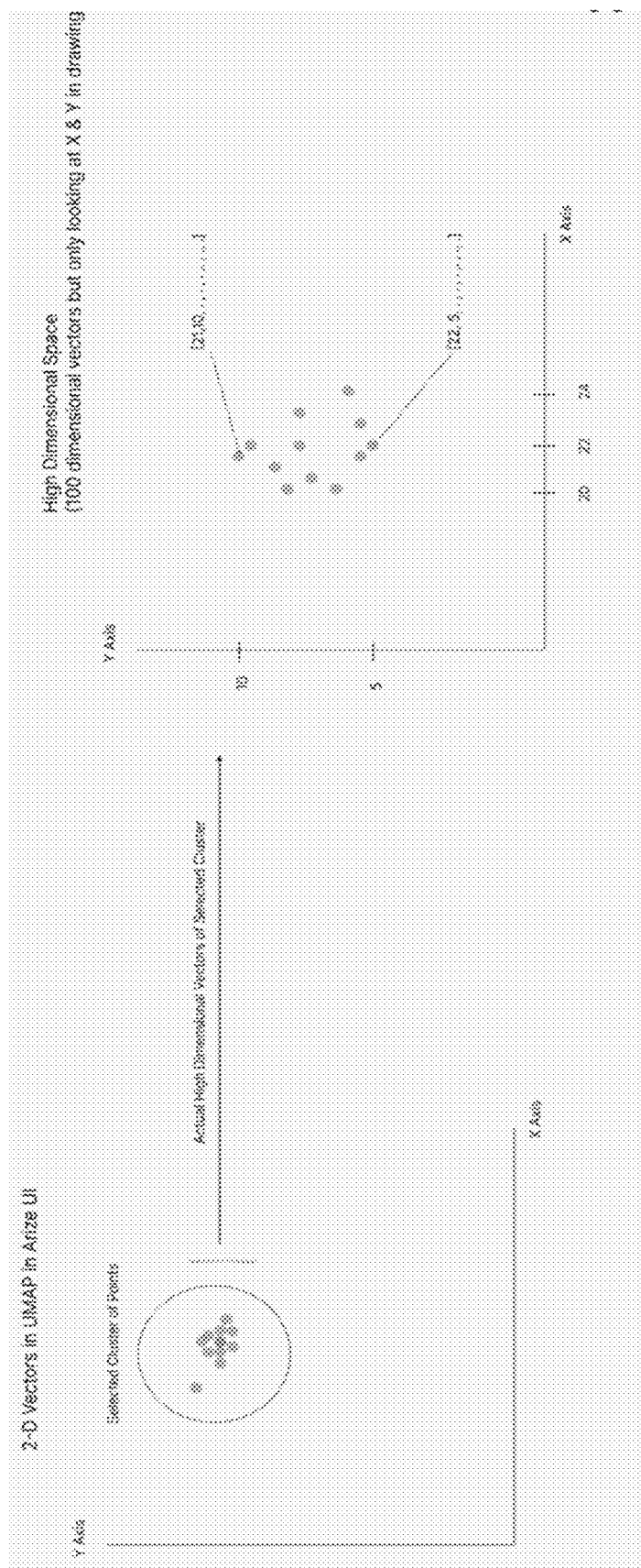
FIG. 7 illustrates the mapping of vectors of a cluster from a two-dimensional space to a 100-dimensional space according to an example embodiment of the present disclosure.

In an example embodiment, the identified clusters can be mapped from the two- or three-dimensional space back to a higher dimensional space. Continuing with the previous example, the cluster 520 with a normalized purity score of 0.56 is identified for mapping from the 2D space to a higher dimensional space. A simple lookup, using UMAP, can be done to map the group of vectors from the low dimensional space to a high dimensional space. FIG. 7 illustrates the mapping of vectors of cluster 520 from a two-dimensional space to a 100-dimensional space.

Furthermore, the vectors from the cluster in high dimensional space can be projected in a high dimensional Hyperbox back onto a larger dataset. This can be done by generating a set of basis vectors that span the manifold by running a principal component analysis (PCA) on the high dimensional vectors of the cluster and projecting a box using the PCA vectors as basis vectors of the box giving the min/max edges of the box. The box edges are applied to the full data set, anything inside the box can be exported. Known techniques can be used for running a PCA, for example: https://towardsdatascience.com/dealing-with-highly-dimensional-data-using-principal-component-analysis-pca-fea1ca817fe6 (last accessed Nov. 28, 2022).

Figure 8:
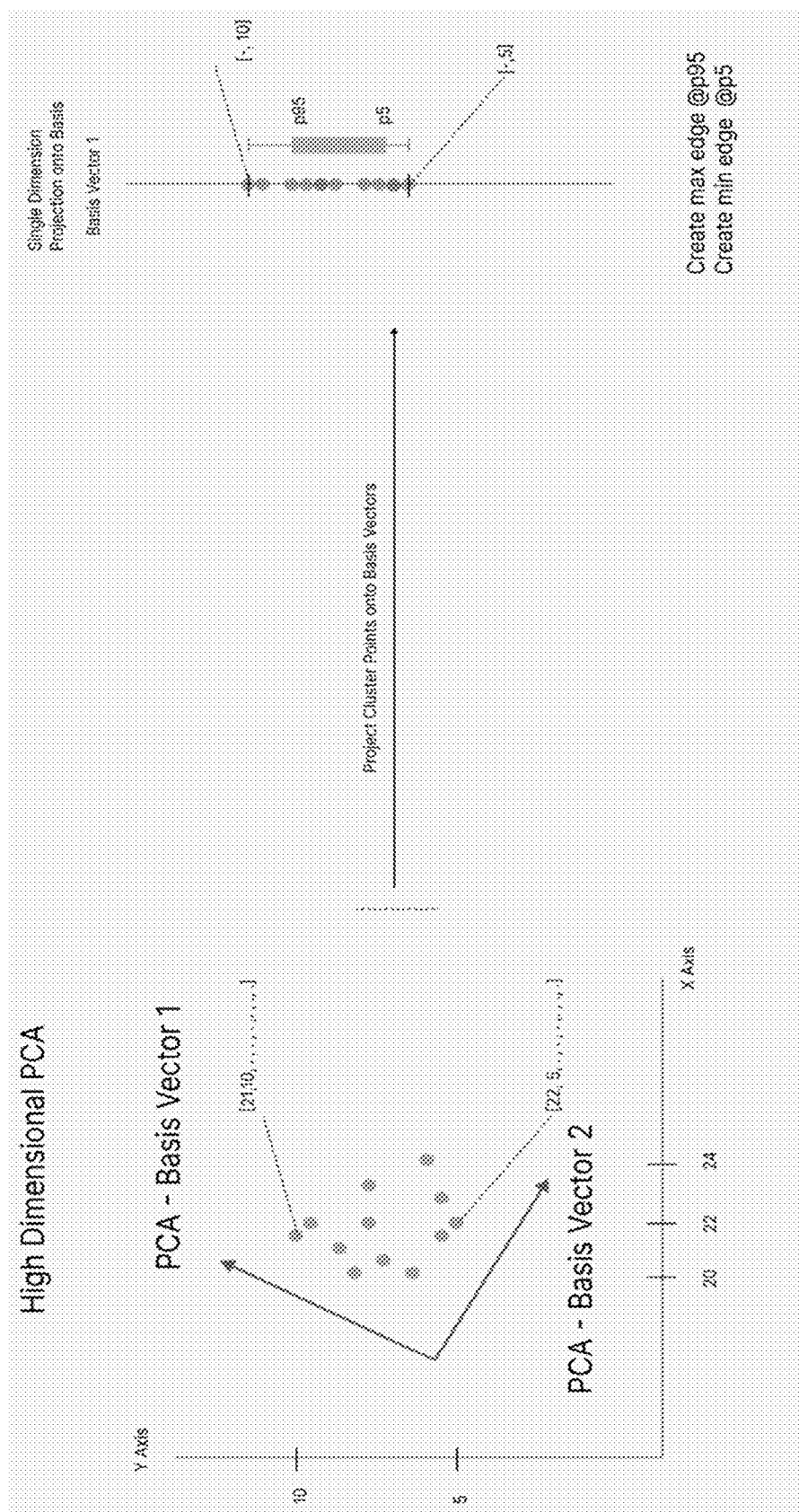
FIG. 8 illustrates the PCA on the cluster points and the high dimensional basis vectors according to example embodiment of the present disclosure.

FIG. 8 illustrates the PCA on the cluster points and the high dimensional basis vectors produced. It also shows the projection of the cluster points onto the basis vector 1. Those points create a distribution, where vectors inside the distribution are considered inside the box. Edges of the Hyperbox are created on the basis vector by selecting edges of the distribution, for example at p5/p95.

Figure 9:
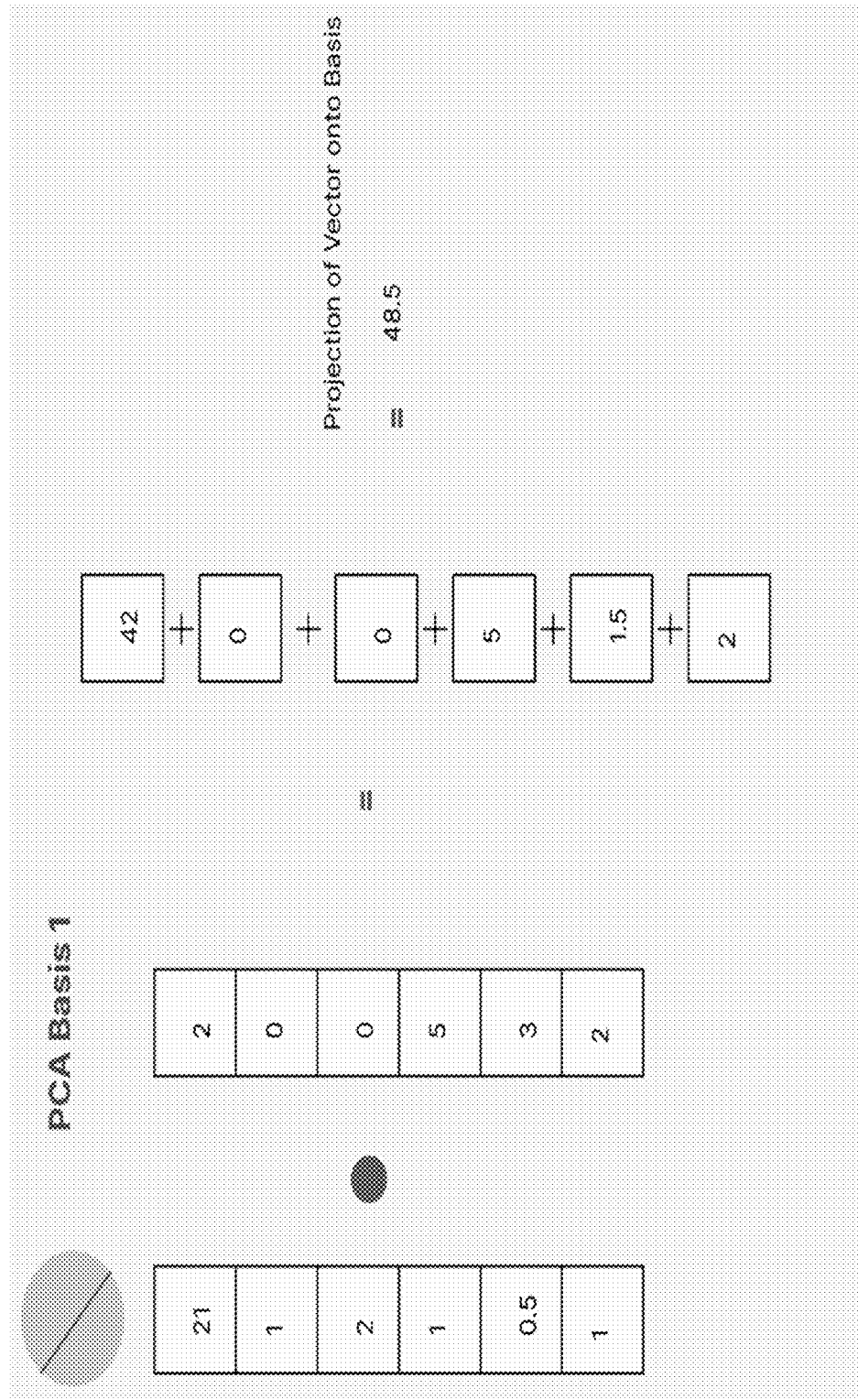
FIG. 9 shows example projecting of cluster points onto a basis of the PCA according to example embodiment of the present disclosure.

FIG. 9 shows an example of projecting each of the cluster points (21, 1, 2, 1, 0.5, 1) onto a basis of the PCA (2, 0, 0, 5, 3, 2) obtained from known techniques described above to get a projection value. The projection value is calculated as a summation of the multiplication of the cluster point values with the PCA. That is, in this example the first vector is projected back as $[(21*2)+(1*0)+(2*0)+(1*5)+(0.5*3)+(1*2)]$ to get 48.5.

Figure 10:
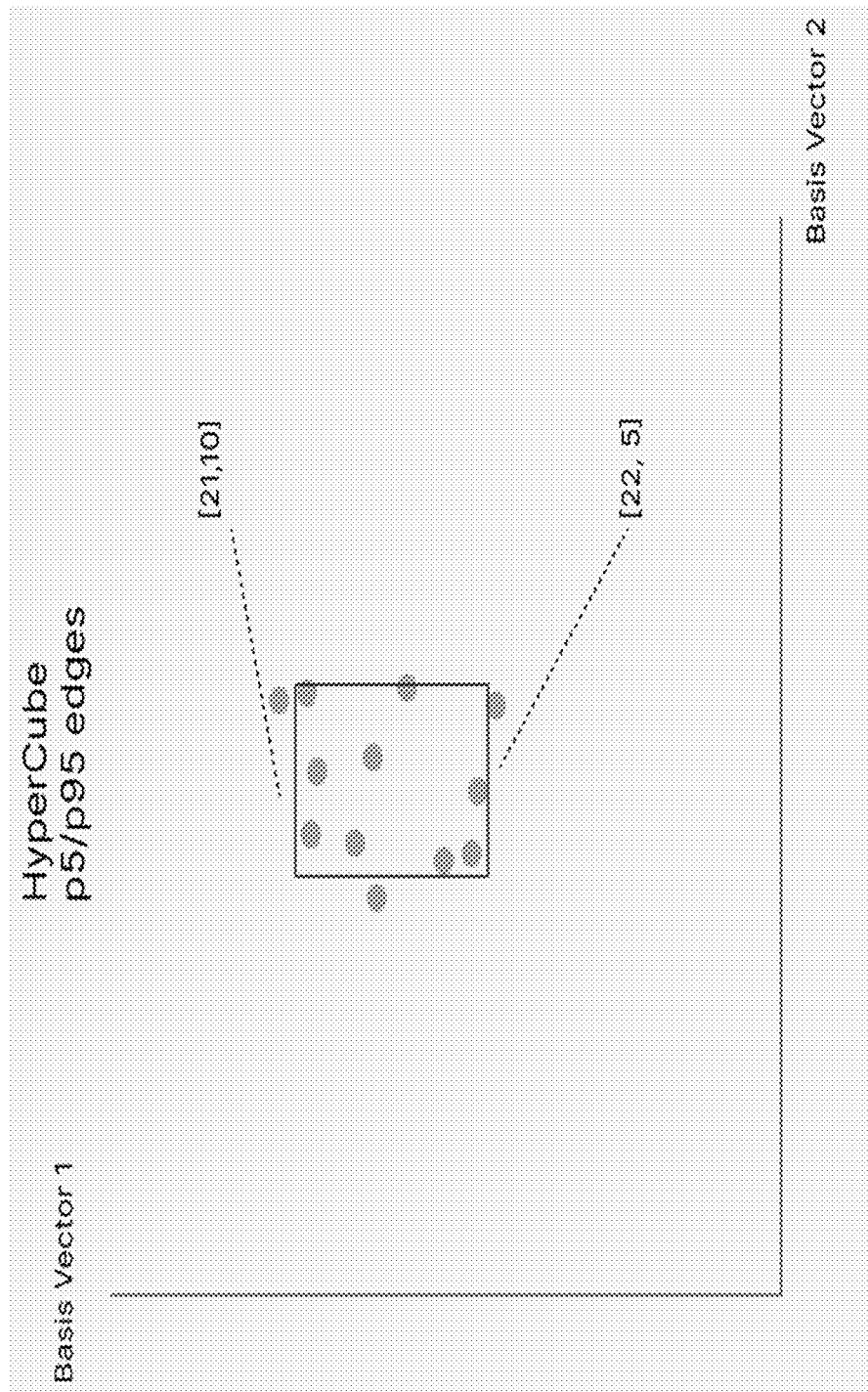
FIG. 10 shows an example Hypercube according to example embodiment of the present disclosure.

This example shows a single point of the cluster with a 48.5 value as projected on basis vector 1. Similarly, all projected points in the cluster projected on each basis vector can form a distribution that can form a box as shown in FIG. 10. As noted earlier, edges of the Hyperbox can be created on the basis vectors by choosing edges of the distribution (p5/p95).

Cluster points inside the Hyperbox can be identified and exported for labeling. To determine whether a cluster point is inside a box, search logic can be employed to check if all dimensions of the cluster point fall within the edges of the box (edges of distribution). In FIG. 10, for example, all dimensions of a cluster point should fall within the edges p5 and p95 of the box created on the basis vectors 1 and 2. The exported cluster points can be used to train or optimize the machine learning model. Techniques described in U.S. Pat. No. 11,315,043 for optimizing the model can be used.

Figure 11:
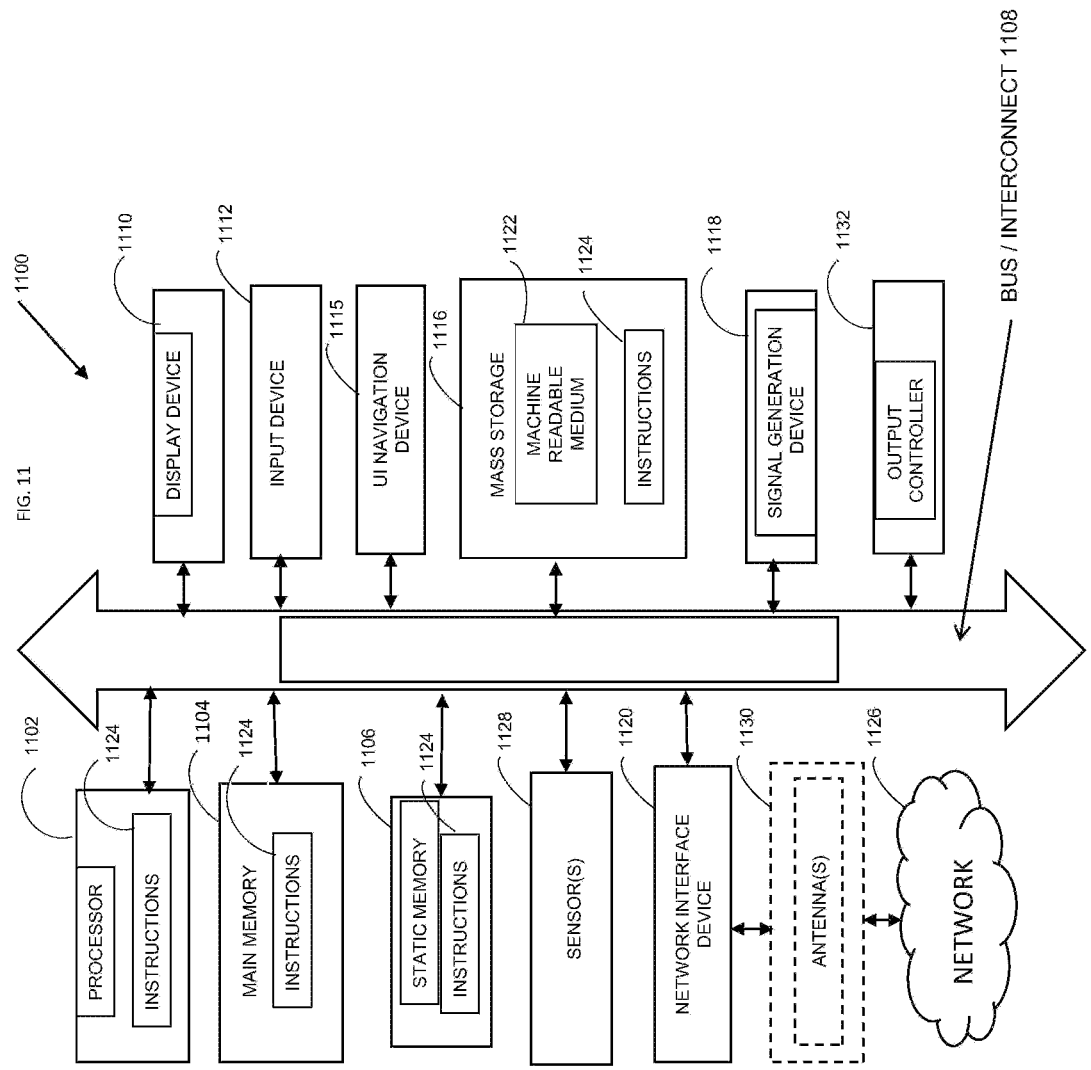
FIG. 11 illustrates a machine configured to perform computing operations according to an example embodiment of the present disclosure.

FIG. 11 shows an example system 1100 that can be used for implementing the method 110 and other aspects of the present disclosure. The system 1100 can include a processor 1102 (e.g., a central processing unit (CPU), a graphics processing unit (GPU) or both) and an associated memory 1104. The processor 1102 can be configured to perform all the previously described steps with respect to method 100. In various embodiments, the computer system 1100 can operate as a standalone device or may be connected (e.g., networked) to other machines. In a networked deployment, the machine may operate in the capacity of either a server or a client machine in server-client network environments, or it may act as a peer machine in peer-to-peer (or distributed) network environments.

Example computer system 1100 may further include a static memory 1106, which communicate via an interconnect 1108 (e.g., a link, a bus, etc.). The computer system 1100 may further include a video display unit 1110, an input device 1112 (e.g., keyboard) and a user interface (UI) navigation device 1114 (e.g., a mouse). In one embodiment, the video display unit 1110, input device 1112 and UI navigation device 1114 are a touch screen display. The computer system 1100 may additionally include a storage device 1116 (e.g., a drive unit), a signal generation device 1118 (e.g., a speaker), an output controller 1132, and a network interface device 1120 (which may include or operably communicate with one or more antennas 1130, transceivers, or other wireless communications hardware), and one or more sensors 1128.

The storage device 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104, static memory 1106, and/or within the processor 1102 during execution thereof by the computer system 1100, with the main memory 1104, static memory 1106, and the processor 1102 constituting machine-readable media.

While the machine-readable medium 1122 is illustrated in an example embodiment to be a single medium, the term "machine-readable medium" may include a single medium or multiple medium (e.g., a centralized or distributed database, and/or associated caches and servers) that store the one or more instructions 1124.

The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions.

The term "machine-readable medium" shall accordingly be taken to include, but not be limited to, solid-state memories, optical media, and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 1124 may further be transmitted or received over a communications network 1126 using a transmission medium via the network interface device 1120 utilizing any one of several well-known transfer protocols (e.g., HTTP). Examples of communication networks include a local area network (LAN), wide area network (WAN), the Internet, mobile telephone networks, Plain Old Telephone (POTS) networks, and wireless data networks (e.g., Wi-Fi, 3G, and 4G LTE/LTE-A or WiMAX networks).

The term "transmission medium" shall be taken to include any intangible medium that can store, encoding, or carrying instructions for execution by the machine, and includes digital or analog communications signals or other intangible medium to facilitate communication of such software.

Other applicable network configurations may be included within the scope of the presently described communication networks. Although examples were provided with reference to a local area wireless network configuration and a wide area Internet network connection, it will be understood that communications may also be facilitated using any number of personal area networks, LANs, and WANs, using any combination of wired or wireless transmission mediums.

The embodiments described above may be implemented in one or a combination of hardware, firmware, and software. For example, the features in the system architecture 1100 of the processing system may be client-operated software or be embodied on a server running an operating system with software running thereon.

While some embodiments described herein illustrate only a single machine or device, the terms "system", "machine", or "device" shall also be taken to include any collection of machines or devices that individually or jointly execute a set (or multiple sets) of instructions to perform any one or more of the methodologies discussed herein.

Examples, as described herein, may include, or may operate on, logic or several components, modules, features, or mechanisms. Such items are tangible entities (e.g., hardware) capable of performing specified operations and may be configured or arranged in a certain manner. In an example, circuits may be arranged (e.g., internally or with respect to external entities such as other circuits) in a specified manner as a module, component, or feature. In an example, the whole or part of one or more computer systems (e.g., a standalone, client or server computer system) or one or more hardware processors may be configured by firmware or software (e.g., instructions, an application portion, or an application) as an item that operates to perform specified operations. In an example, the software may reside on a machine readable medium. In an example, the software, when executed by underlying hardware, causes the hardware to perform the specified operations.

Accordingly, such modules, components, and features are understood to encompass a tangible entity, be that an entity that is physically constructed, specifically configured (e.g., hardwired), or temporarily (e.g., transitorily) configured (e.g., programmed) to operate in a specified manner or to perform part or all operations described herein. Considering examples in which modules, components, and features are temporarily configured, each of the items need not be instantiated at any one moment in time. For example, where the modules, components, and features comprise a general-purpose hardware processor configured using software, the general-purpose hardware processor may be configured as respective different items at different times. Software may accordingly configure a hardware processor, for example, to constitute a particular item at one instance of time and to constitute a different item at a different instance of time.

Additional examples of the presently described method, system, and device embodiments are suggested according to the structures and techniques described herein. Other non-limiting examples may be configured to operate separately or can be combined in any permutation or combination with any one or more of the other examples provided above or throughout the present disclosure.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

It should be noted that the terms "including" and "comprising" should be interpreted as meaning "including, but not limited to". If not already set forth explicitly in the claims, the term "a" should be interpreted as "at least one" and "the", "said", etc. should be interpreted as "the at least one", "said at least one", etc. Furthermore, it is the Applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A computer-implemented method for optimizing a machine learning model, the method comprising:
    obtaining one or more embedding vectors based on a prediction of the machine learning model;
    mapping the embedding vectors from a higher dimensional space to a two- or three-dimensional space to generate one or more high density points in the two- or three-dimensional space, each high-density point including at least one of the embedding vectors;
    clustering the high-density points by running a clustering algorithm multiple times, each time with a different set of parameters to generate one or more clusters;
    applying a purity metric to each cluster to generate a normalized purity score of each cluster;
    identifying one or more clusters with a normalized purity score lower than a threshold; and
    optimizing the machine learning model based on the identified one or more clusters.

2. The method of claim 1, wherein the optimizing comprises:
    training the machine learning model based on vectors in the identified clusters.

3. The method of claim 1, wherein the optimizing comprises:
    mapping the identified clusters in the two- or three-dimensional space back to the higher dimensional space;
    generating a high dimensional Hyperbox by projecting vectors from the clusters in the higher dimensional space; and
    training the machine learning model based on vectors contained within the Hyperbox.

4. The method of claim 1, wherein the mapping of the embedding vectors is based on Uniform Manifold Approximation and Projection for Dimension Reduction (UMAP).

5. The method of claim 1, wherein the clustering is based on a HDBScan clustering algorithm.

6. The method of claim 1, wherein the clusters are identified based on a run of the clustering algorithm that maximizes a total number of clusters.

7. The method of claim 1, wherein a purity score of a cluster is based on a ratio of a total number of high-density points in a training environment and a total number of high-density points in a production environment.

8. The method of claim 7, wherein the purity score is normalized based on a ratio of the total number of points in the training and production environments to generate the normalized purity score.

9. The method of claim 1, wherein the generating of the high dimensional Hyperbox comprises running a principal component analysis (PCA) on the vectors in the higher dimensional space.

10. The method of claim 1, further comprising exporting vectors contained within the Hyperbox for labeling.

11. A system for optimizing a machine learning model, the system comprising:
    a processor and an associated memory, the processor being configured for:
    obtaining one or more embedding vectors based on a prediction of the machine learning model;
    mapping the embedding vectors from a higher dimensional space to a two- or three-dimensional space to generate one or more high density points in the two- or three-dimensional space, each high-density point including at least one of the embedding vectors;
    clustering the high-density points by running a clustering algorithm multiple times, each time with a different set of parameters to generate one or more clusters;
    applying a purity metric to each cluster to generate a normalized purity score of each cluster;
    identifying one or more clusters with a normalized purity score lower than a threshold; and
    optimizing the machine learning model based on the identified one or more clusters.

12. The system of claim 11, wherein the optimizing comprises:
    training the machine learning model based on vectors in the identified clusters.

13. The system of claim 11, wherein the optimizing comprises:
    mapping the identified clusters in the two- or three-dimensional space back to the higher dimensional space;
    generating a high dimensional Hyperbox by projecting vectors from the clusters in the higher dimensional space; and
    training the machine learning model based on vectors contained within the Hyperbox.

14. The system of claim 11, wherein the mapping of the embedding vectors is based on Uniform Manifold Approximation and Projection for Dimension Reduction (UMAP).

15. The system of claim 11, wherein the clustering is based on a HDBScan clustering algorithm.

16. The system of claim 11, wherein the clusters are identified based on a run of the clustering algorithm that maximizes a total number of clusters.

17. The system of claim 11, wherein a purity score of a cluster is based on a ratio of the total number of high-density points in a training environment and the total number of high-density points in a production environment.

18. The system of claim 17, wherein the purity score is normalized based on a ratio of the total number of points in the training and production environments to generate the normalized purity score.

19. The system of claim 11, wherein the generating of the high dimensional Hyperbox comprises running a principal component analysis (PCA) on the vectors in the higher dimensional space.

20. The system of claim 11, further comprising exporting vectors contained within the Hyperbox for labeling.

* * * * *